May 29, 1956  R. RÜDENBERG  2,748,339
CHARGED PARTICLE A.C. GENERATOR
Filed Aug. 17, 1951  7 Sheets-Sheet 1
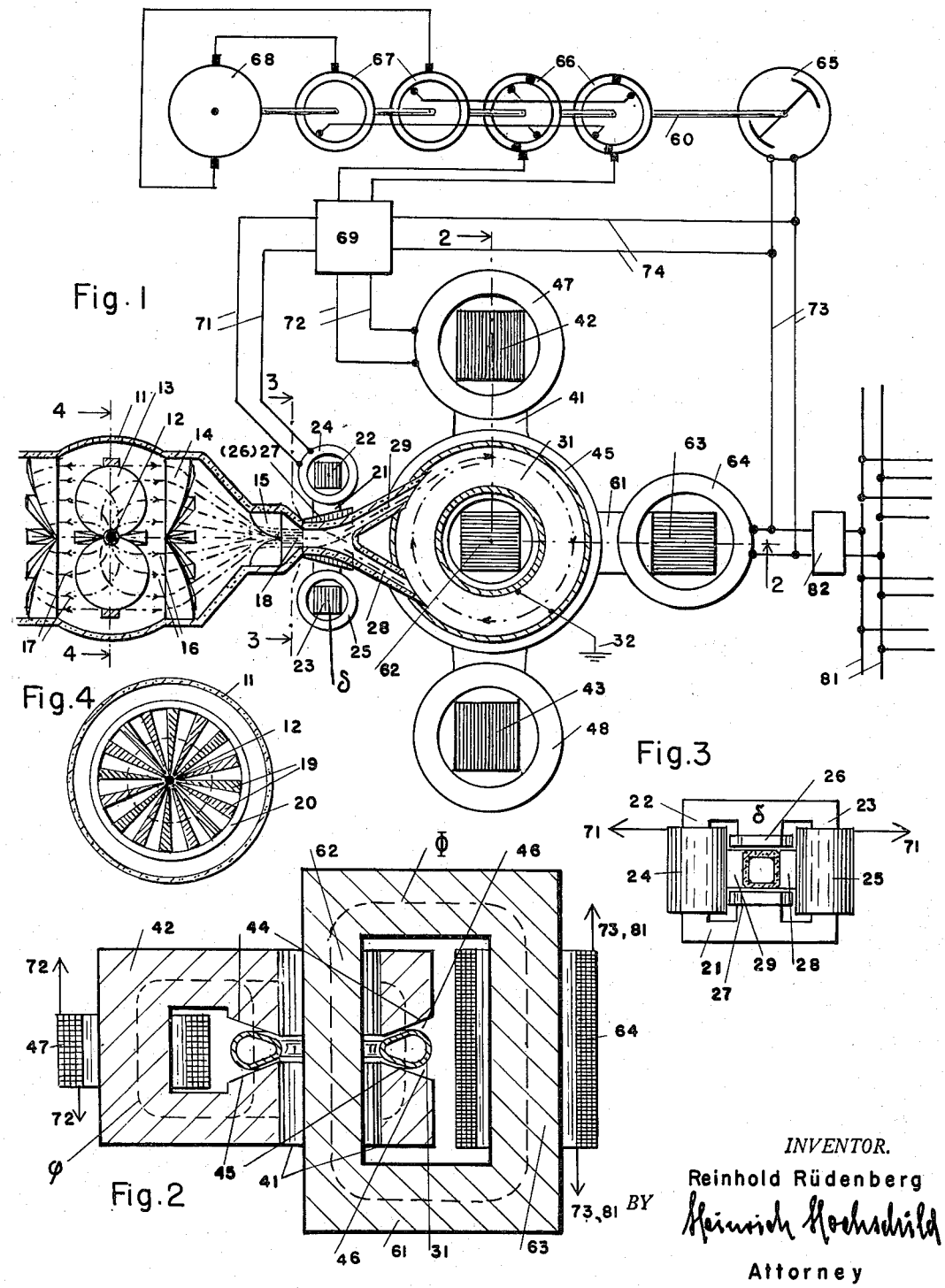
INVENTOR.
Reinhold Rüdenberg
BY Heinrich Hochschild
Attorney May 29, 1956  R. RÜDENBERG  2,748,339
CHARGED PARTICLE A.C. GENERATOR
Filed Aug. 17, 1951  7 Sheets—Sheet 2
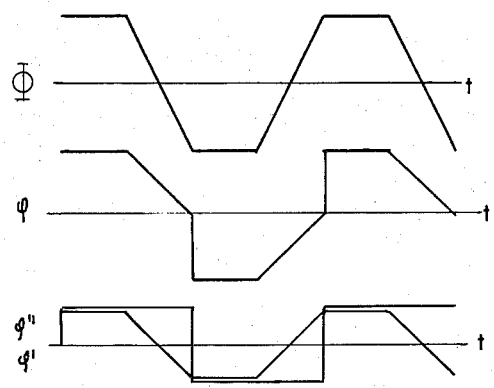
Fig. 5
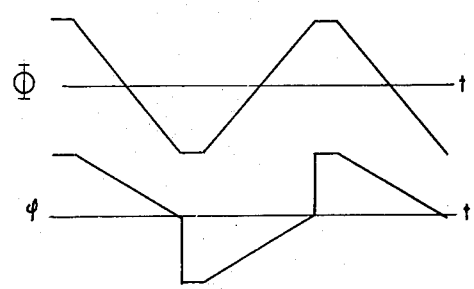
Fig. 6
Fig. 7
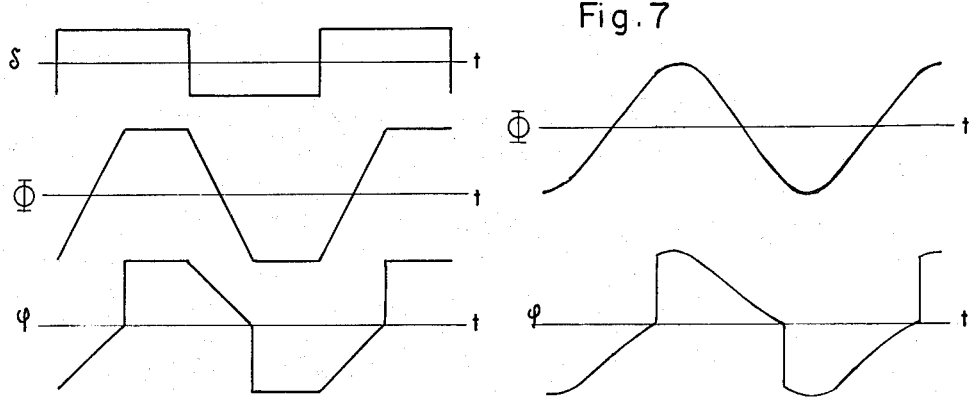
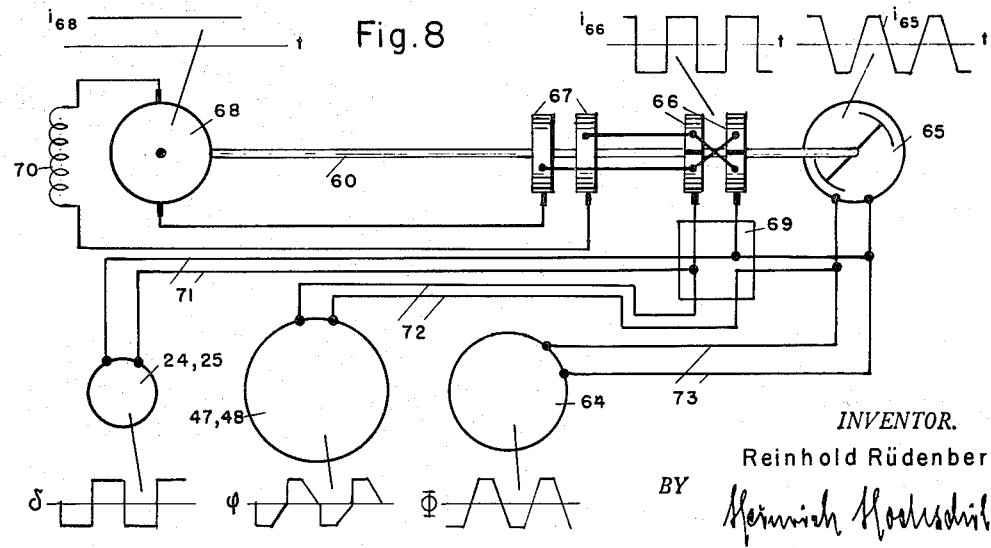
Fig. 8
INVENTOR.
Reinhold Rüdenberg
BY
Attorney May 29, 1956  R. RÜDENBERG  2,748,339
CHARGED PARTICLE A.C. GENERATOR
Filed Aug. 17, 1951  7 Sheets-Sheet 4

INVENTOR.
Reinhold Rüdenberg
BY
Attorney

May 29, 1956 R. RÜDENBERG 2,748,339
CHARGED PARTICLE A.C. GENERATOR
Filed Aug. 17, 1951 7 Sheets-Sheet 5

INVENTOR.
Reinhold Rüdenberg
By Heinrich Hochschild
Attorney

May 29, 1956 — R. RÜDENBERG — 2,748,339
CHARGED PARTICLE A.C. GENERATOR
Filed Aug. 17, 1951 — 7 Sheets-Sheet 6

INVENTOR.
Reinhold Rüdenberg
BY
Attorney

May 29, 1956 — R. RÜDENBERG — 2,748,339
CHARGED PARTICLE A.C. GENERATOR
Filed Aug. 17, 1951 — 7 Sheets-Sheet 7
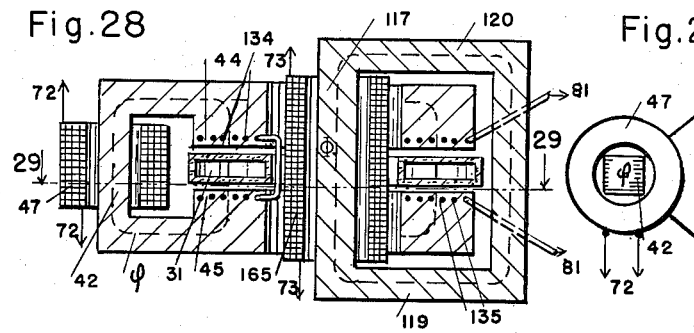
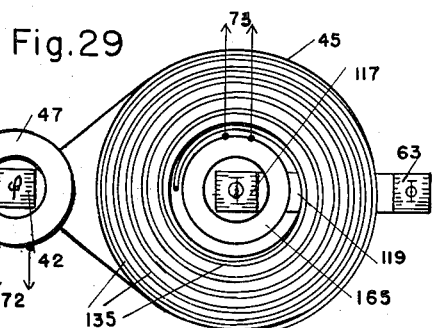
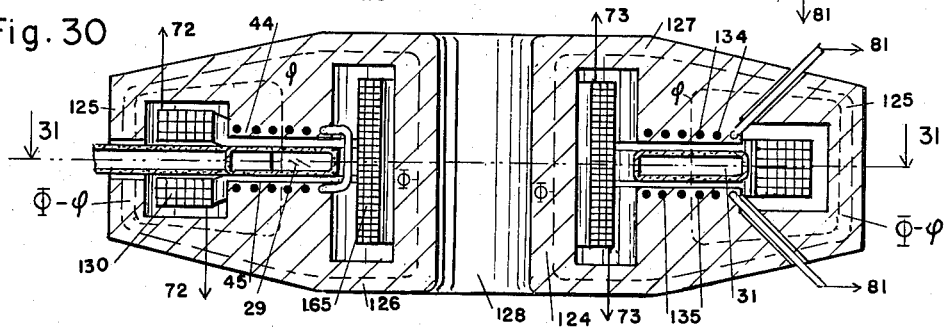
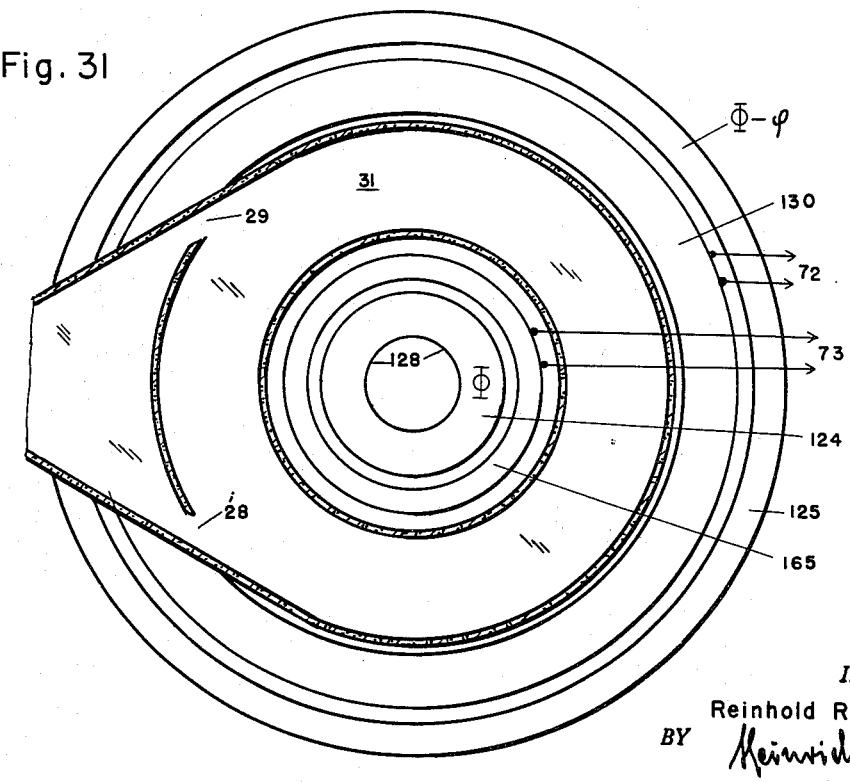
INVENTOR.
Reinhold Rüdenberg
BY
Attorney United States Patent Office 2,748,339
Patented May 29, 1956

2,748,339

CHARGED PARTICLE A. C. GENERATOR

Reinhold Rüdenberg, Belmont, Mass.

Application August 17, 1951, Serial No. 242,286

32 Claims. (Cl. 322—2)

The invention is concerned with a method of and apparatus for converting into energy of an electric network the energy of electrically charged particles as they are emitted with high velocity from a carrier of radiant atomic energy and it is a principal object of the invention to convert the energy of these electrically charged particles directly into electric energy to be supplied into an electric network without any necessity of transforming the energy of these particles into caloric energy in the pile.

It is to be understood that the production of the carrier of radiant atomic energy is not an object of the invention nor is any specific type of such a carrier. For the purpose of the invention any source or material may be employed which by any nuclear reaction emits electrically charged particles, such as electrons or protons or ions or particles such as neutrons which at this source or material while being emitted may by specific means be charged electrically.

In such general meaning the term "carrier of radiant atomic energy" is to be understood when this term is employed in the following specification and in the claims, and this term is to include any carrier emitting any type of electrically charged particles utilizable for the purposes of the invention, in any form or shape the "carrier" may be, such as a body consisting of or including radiant atomic material or surfaces coated with or permeated with such radiant material and applied to supports of any type or shape, bands, spheres, pellets or the like.

More particularly it is an object of the invention to transform the energy of motion of such electrically charged particles emitted from a source of radiant atomic energy into alternating current energy.

To this end the invention makes use of the phenomenon of electromagnetic induction in accordance with Faraday's induction law.

Objects of the invention thus are methods of and apparatus for such inductive energy conversion by focusing and directing the particles towards and into certain orbits and bringing them into such spatial and functional relationship with a magnetic flux that the motion of the particles is decelerated and the energy of deceleration converted inductively into alternating current.

Further objects of the invention are methods of and apparatus for collecting the emitted divergent rays of charged particles into a bundle of unidirectional rays of desired configuration or vergency, parallel, or diverging from, or converging to a certain focus; deflecting or otherwise controlling this bundle by space fields established by polarized electromagnetic elements.

When in the following specification and in the claims the term "ray" is employed, this term is to be understood as the straight propagation line on which an electrically charged particle moves. Under the term "beam," there is to be understood a plurality of such rays generally issuing from a common source and directed to a common target or target area. A "bundle of rays" is to be understood as a plurality of rays passing through a common area, rays which may, but need not, diverge in their directions.

The term "vergency" is to be understood generally as the inclination of the rays of a bundle relatively to one another thus including either of the terms: divergence, convergence, or parallelism.

The term "electromagnetic" when employed in this specification and in the claims is to be understood in its broadest conventional meaning. When thus applied to space fields, the term is to include magnetic fields, produced between "polarized magnetic elements," i. e. poles of permanent magnets or magnet poles excited by an electric current, constant or varying or also magnetic fields excited by such currents in air or in a vacuum. The term "electromagnetic" is also to include electric fields, produced between "polarized electric elements," i. e. between electric poles or conducting elements or plates or layers of differing polarities, between which a potential difference is sustained, or electric poles produced by a changing magnetic flux.

These polarized elements thus, when their capacity of producing a space field of any type—permanent magnetic, electromagnetic, electroconductive, or electrostatic —is to be considered, will thus be designated as "polarized, space field producing elements."

The invention thus contemplates the transmutation of the energy of motion of electrically charged particles, emitted with high velocity from a carrier of radiant atomic energy, into usable electric energy by guiding the particles so as to rotate around a changing magnetic flux in such a direction that they circulate against the electric forces induced by the variation of the flux according to Faraday's induction law. In this way, the particles will be decelerated, presenting their energy to the magnetic flux which in turn will transfer the energy to a secondary, or energy coil in the same way as an ordinary electromagnetic transformer transfers electric energy from a primary to a secondary winding.

After the particles are decelerated to low or zero velocity the magnetic flux will reverse its direction of change and the new particles will be guided to rotate in the opposite direction than before around the flux so that now voltage and current of opposite directions are transferred to the secondary coil. By continuously repeating this process electric energy will be generated in the coil drawn from the kinetic energy of the atomic particle radiation.

The frequency of the voltages and currents produced will depend upon the rhythm in which the direction of rotation of the particles around the flux is changed, simultaneously with the variation of the magnetic flux, and thus may be freely chosen by proper timing of the mechanism of the device which hereinafter will be explained in detail. It is an advantage of this transformer of the invention that it can be built with such dimensions that it may operate in a rhythm equal to the frequencies ordinarily used in electric power systems, not excluding however any higher or lower frequencies.

In accordance with the invention, therefore, for converting into alternating current the energy of electrically charged particles emitted from a carrier of radiant atomic energy, a bundle of the charged particles is periodically directed into substantially circular orbits around a periodically changing magnetic flux. The particles are thus decelerated on the orbits and energy of deceleration converted into alternating current energy, and finally the charges of the de-energized particles are led off.

In an embodiment of the method of the invention, space fields generated by polarized electromagnetic elements and disposed in close proximity to the trajectories of the particles are employed for converging the divergent, emitted rays into a bundle of parallel rays and for directing alternatingly and periodically the bundle into, and charging therewith, a circular closed orbital space around a magnetic flux and causing the particles to revolve in the orbital space on substantially circular orbits. Thereon, by changing the flux, the charged particles on the orbits are decelerated and by electromagnetic induction the energy of deceleration is converted into alternating current energy, whereupon, finally, the charges of the de-energized particles are led off.

The apparatus of the invention includes a toroidal vacuum chamber, an energy transformer comprising a magnetic core, a secondary winding on the core. The secondary winding is connected by appropriate network means to an alternating current network. The toroidal chamber is likewise disposed on and magnetically linked with the core of the energy transformer. A conduit opens into the toroidal chamber and leads the bundle thereinto.

A steering circuit system with control and synchronizing means energizes a deflector system disposed about the bundle and produces in the deflector a space field which traverses the bundle and alternates rhythmically so as to steer the bundle into the chamber and thereon deflect it, into another direction into the chamber or from the chamber.

The toroidal chamber is further disposed in a gap extended between a pair of polarized electromagnetic elements. A guiding circuit system is provided for establishing between the polarized elements a guiding space field which thus traverses the toroidal chamber. The control and synchronizing means of this energizing circuit control the space field so that it varies in its intensity dependent upon the velocity of the particles and causes them to revolve irrespective of their velocity on substantially constant circular orbits in the toroidal chamber in a closed orbital space.

A magnetizing circuit coupled with the secondary winding of the energy transformer produces in the core of the energy transformer a rhythmically alternating magnetizing field. This field is linked with the toroidal chamber and is directed in relation to the sense of revolution of the particles in the chamber so that this field, during the decreasing and increasing periods of its cycles decelerates the particles revolving in the chamber and charged thereto during other periods of the magnetizing field cycles. By electromagnetic induction in the transformer the energy of deceleration will be converted into alternating current to be supplied from the secondary winding of the energy transformer into the alternating current network.

Other objects and features of the invention refer to novel lens systems for collecting the divergent rays of particles emitted from the carrier of radiant atomic energy and refracting them into the bundle of unidirectional rays which then is directed by further lens systems through the deflector system or various deflector stages into the toroidal chamber.

Still other objects and features of the invention will in part become obvious and will in part appear hereinafter as the specification proceeds.

For further explanation of the invention, of the phenomena which underlie the same and for its illustration, various embodiments of the invention will now be set forth in the ensuing specification and various embodiments of the invention will be illustrated in and by the accompanying drawings which are to be understood explicative of the invention and not limitative of its scope. Other embodiments incorporating the principles underlying my invention are feasible without departing from the spirit and ambit of my appended claims.

In the drawings:

Fig. 1 is a diagram of the arrangement of an atomic electric energy transforming apparatus with separator, collecting lens system, deflector, guiding field system, energy transformer and appertaining steering, control and magnetizing circuits with control and synchronizing means for the conversion of radiant atomic energy into alternating current;

Fig. 2 is in diagrammatic view a schematic elevation of the energy transformer taken on line 2—2 of Fig. 1;

Fig. 3 is a diagrammatic elevational view of the deflector system taken on line 3—3 of Fig. 1;

Fig. 4 is a schematic view, taken on line 4—4 of Fig. 1, of a cross section of a space lens system comprising permanent magnetic elements;

Fig. 5 shows curves of the course in time of the various fluxes in the apparatus of Fig. 1;

Figs. 6 and 7 show modifications of curves representing the courses in time of fluxes;

Fig. 8 is a diagram of the energizing, steering, guiding, and magnetizing circuits with control and synchronizing means of Fig. 1 together with an example of curve shapes of currents and fluxes they respectively lead and produce in controlled synchronization;

Figure 16:
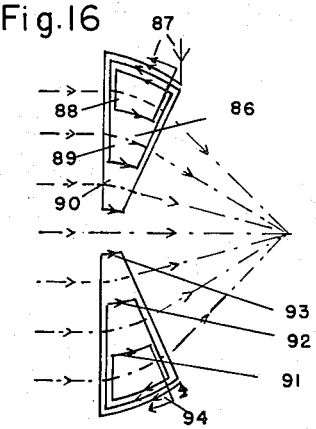
Figure 17:
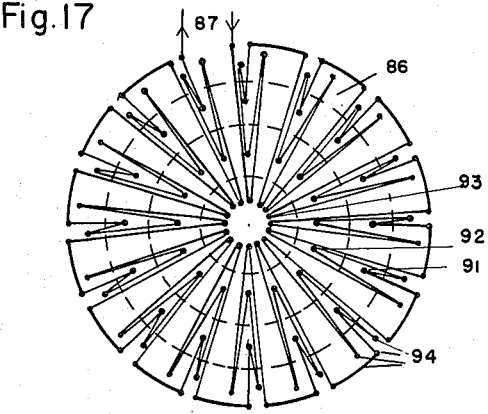
Figures 18, 19:
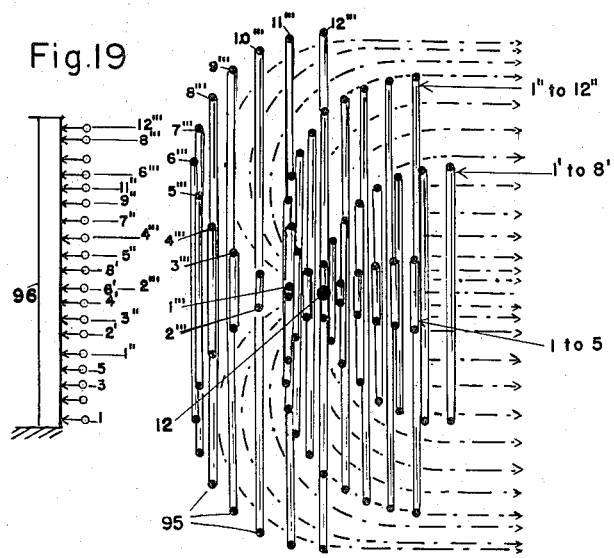
Figure 20:
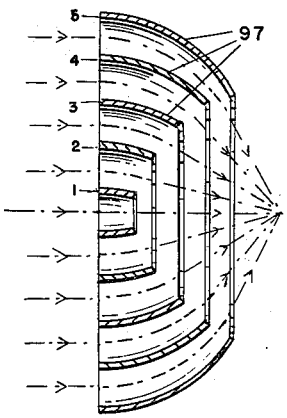
Figure 21:
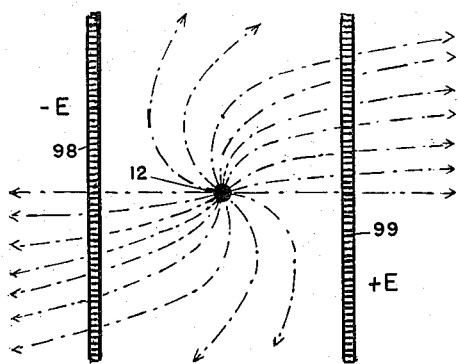
Figure 22:
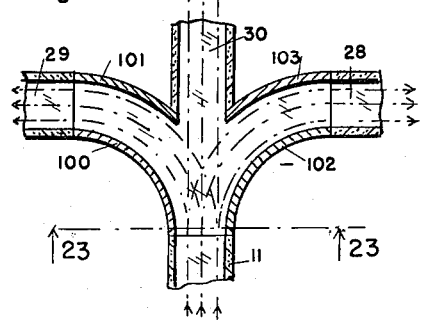
Figure 23:
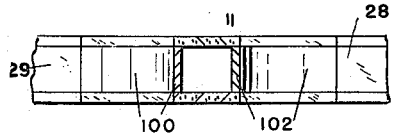
Figure 24:
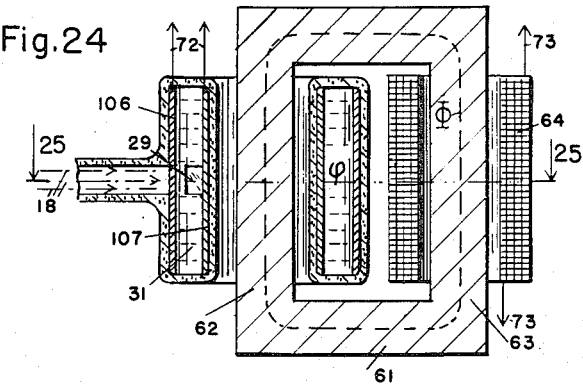
Figure 25:
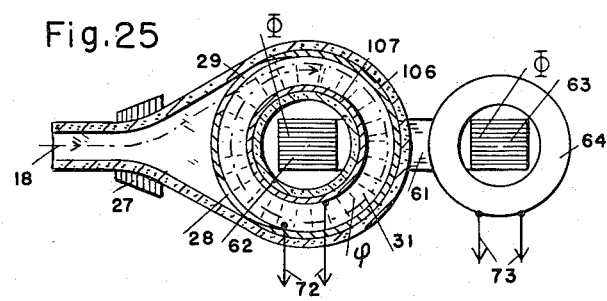
Figure 26:
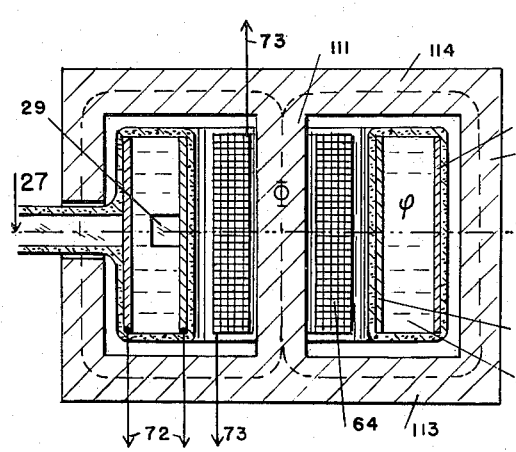

Figs. 16 and 17 respectively are in diagrammatic view longitudinal and transversal sections of space lens systems comprising coils;

Figs. 18 and 19 respectively are in diagrammatic view a longitudinal section of an electrostatic space lens systems comprising transversal rings and a voltage divider for polarizing the various rings;

Fig. 20 is a cross section of an electrostatic lens system comprising calottes as polarized electromagnetic elements;

Fig. 21 is in diagrammatic view a longitudinal section of a separator lens system comprising polarized grids;

Figs. 22 and 23 are in diagrammatic view respectively a longitudinal section of an electrostatic deflector and a transversal section thereof taken on line 23—23 of Fig. 22;

Figs. 24 and 25, and Figs. 26 and 27 are in diagrammatic view respectively elevational and transversal sections of two modifications of energy transformers with electrostatic guiding fields; the transversal sections being taken on line 25—25 of Fig. 24 and on line 27—27 of Fig. 26 respectively;

Figs. 28 and 29, and Figs. 30 and 31 are in diagrammatic view respectively elevational and transversal sections of two modifications of energy transformers with magnetic guiding field and compensating energy windings, the transversal sections being taken on line 29—29 of Fig. 28 and on line 31—31 of Fig. 30, respectively.

In the drawings, I have shown for clearer illustration of the principle underlying the invention the various embodiments rather diagrammatically, also by symbols and block diagrams, as conventional in the art of electrical engineering, apparatus such as generators, motors, transformers, lines, network means, and the like. Furthermore, for the clearness of representation and in order to avoid crowding of the drawings with details, various apparatus are shown by the principal schematic sectional views, details such as lamination of the magnetic cores being only indicated by wide spaced hatching in sections along the lamination, in other cases being also omitted, the direction of the lamination being then given through the general direction of the fluxes. Similarly, windings are indicated only by single or double circles, details of such structures following the general principles known in the art, windings and sections of magnetic cores thus being given only by their outlines, in some instances.

*General description*

In Fig. 1 the main components of the atomic-electric energy transformer are diagrammatically shown.

A vacuum recipient 11 encloses a source or carrier 12 emitting radiant atomic energy. Three lens systems are designated by 13, 14, 15.

The material of the source or carrier 12 is in a state of atomic disintegration which may have been produced before the material was brought into its position, or which may be continuously initiated for example by a stream of neutrons.

Since the type of the carrier or its excitation or its condition or the process which causes or sustains the radiation forms no part of the invention, the carrier irrespective of its type is generally indicated by a black circle. Fig. 1 thus refers merely to the utilization of the atomic power contained in the particle radiation omitted. Some materials radiate positively charged or alpha particles; others radiate negatively charged or beta particles. Still others emit both types of particles in comparable quantities.

In any of these cases, the particles originally are emitted diverging into all directions of the space. It is therefore useful to deflect the rays of particles into one or more preferential directions, even if only one type of particles is present. Oppositely charged particles are to be segregated into separate beams before they are admitted to the subsequent stages of the apparatus.

To these purposes, deflecting or separating the diverging particles into one or more directions, a first lens system 13 is employed the details of which will be explained and described later on. In Fig. 1, this first lens system 13 is indicated as a separator lens which by means of electromagnetic forces separates for instance positive and negative particles into two separate beams 16, 17. If particles of only one polarity are radiated, a lens of the same type will deflect the particles into one beam either 16 or 17.

The right hand beam 16 of Fig. 1 is now to be concentrated into a narrow bundle 18 of unidirectional, substantially parallel particle rays. To this purpose, the bundle is first passed through a collector lens 14 which, also by use of electromagnetic forces, converges the radiation towards a condensor lens 15 which, again by electromagnetic forces, concentrates the radiation to a parallel or nearly parallel beam 18 of narrow cross section.

This beam enters a deflector system generally designated by 21 whose detail and functions will also be described later on. The deflector system by alternating electromagnetic forces, deflects in the instance of Fig. 1 the beam successively in time into two directions which lead it by means of a two-way conduit 28, 29 into the toroidal vacuum chamber 31 wherein the particles are to rotate alternately in opposite directions. The conduits may consist of a common steel tube or of two separate shielding steel tubes in order to secure a rectilinear motion of the particles into the field of the vacuum chamber. Auxiliary electric or magnetic fields may be provided for gradually transferring the straight motion to a circulation around the chamber, the reverse as is known with particle accelerators.

In order to secure the least amount of scattering and absorption of the particles, the vacuum recipient 11 is extended to the conduit 28, 29, so that the beam will run from its origin to the toroidal chamber in a vacuum enclosure. The conduit is so arranged that both its branches or sides open into the toroidal chamber 31 nearly tangentially and that the particles rotating in the chamber will not hit the mouths of the conduits on the further orbits.

In order to guide the charged particles on a circular or nearly circular orbit within the main vacuum chamber, an electromagnetic guiding space field system is provided. This space field system, in the instance of Figs. 1 and 2 generally designated by 41, includes a pair of polarized electromagnetic elements, in this instance a pair of magnet poles 44, 45, of a magnetic core 42. The magnet poles, ring-like extended, confine between themselves a gap 46 in which the toroidal chamber 31 is disposed. The magnet core 42, 43 is excited by the energizing winding 47, 48, connected to a guiding circuit system with control and synchronizing means.

By means of this guiding circuit system, whose details and function will be described hereinafter, a guiding space field, $\varphi$, in this instance a magnetic field is established between the magnet poles or, in the case of another than magnetic field, other pair of polarized electromagnetic elements. This guiding space field is controlled by means of the control and synchronizing means so as to vary in its intensity dependent upon the velocity of the particles in the toroidal chamber. The guiding space field, which is essentially perpendicular to the orbit of the particles, produces centripedal forces on the particles and thus leads them around the center of the ring-shaped vacuum chamber and is so controlled that the particles revolve, irrespective of their velocity, on substantially constant circular orbits in the toroidal vacuum chamber in a closed orbital space. For attaining a good stability of the particle orbits within this chamber, the gap 46 may be shaped to have a length depending on the radius. In this way the radius of the orbit may be set by proper design of the apparatus, taking into consideration the momentum of the particles. The guiding flux $\varphi$ must change its direction always when the particle beam by the deflector 21 is switched over from one to the other direction of rotation.

A magnetic transformer 61, 62, 63, is provided and serves as decelerator by means of which the motion of the particles revolving in the toroidal chamber is to be decelerated. This transformer serves also as energy transformer and converts the energy of deceleration inductively into alternating current. The core of this transformer is extended with one leg 62 centrally through the vacuum chamber 31 as well as through the poles 44, 45, of the guiding space field system and is closed back externally by the leg 63. This leg is surrounded by a secondary coil 64 which carries alternating current for exciting the flux $\phi$ in the core. The change with time of this flux may be sinusoidal, or trapezoidal, or near to such curve shapes.

*Operation of the decelerator*

The operation of the transformer will now be explained with reference to Fig. 5 in which the change with time of the various magnetic fields is shown, a trapezoidal curve shape of the transformer flux $\phi$ being chosen for the sake of simplicity. During the maximum of flux $\phi$ the guiding flux $\varphi$ is kept constant and through this time the particles are led by action of the deflector 21 into the one path of the conduit, for instance 29. During this charging period, an intense circular stream of particles will accumulate in the chamber, rotate around the core 62 and thus constitute an electric convection current, Then, the central flux $\phi$ will change from its maximum through zero to its opposite maximum, and at the same time the guiding field $\varphi$ will decrease from its maximum to zero, as shown for both fields in the first two lines of Fig. 5.

The change of flux $\phi$ decelerates the particles in the ring current gradually from their initial velocity toward zero. In order to keep the particles circulating within the vacuum chamber, the guiding field $\varphi$, in this instance a magnetic guiding space field, must change proportionally with the velocity of the particles. Since with linear change of the flux $\phi$ a constant retarding force is induced which reduces the particle speed linearly with time, the guiding field $\varphi$ should also decrease linearly toward zero to fulfill its purpose. Quite generally, in order to keep the radius of rotation of the particles constant, the guiding field $\varphi$ must change at the same rate as the inducing flux $\phi$ whatever its curve shape may be, and reach the final value zero when the flux $\phi$ has retarded the particles to zero velocity. Approaching this time the ring cloud of particles will expand under the forces of its own space charge and contact the wall of the vacuum chamber. In order to lead this charge to the earth the inner wall of the torodial chamber shall be made semiconductive and connected to the ground, as indicated in Fig. 1 at 32.

After the end of the retarding period, the deflector 21 switches the particle beam to the other side 28 of the conduit and, during the negative maximum of flux $\phi$, charges the chamber again, but in the opposite direction of rotation. When now the main flux $\phi$ increases to its positive maximum as in Fig. 5 the flux will again decelerate the particles toward zero. The particles will be kept on the original radius by reversing the guiding field $\varphi$ at the beginning of the charging period and then again decreasing it gradually toward zero. In this way the operation of the transformer will be kept continuous and it is obvious that the core 62 is linked thus with an alternating convection current consisting of the stream of particles rotating around the core. This annular particle stream therefore constitutes the primary current in the transformer whose flux $\phi$ also is linked with the secondary coil connected to an electric load or a supply network 81 in Fig. 1.

The intensity of any convection current is determined by the product of the charge and the velocity of its motion. Here, therefore, the primary current starts from zero at the beginning of the charging period, rises linearly with increasing charge to a maximum at the end of this period, and gradually decreases back to zero with the deceleration of the charged particles. Then the same change of current will occur with reversed sign, and this thereafter will repeat itself continuously. Thus the curve shape of the primary convection current is essentially triangular, and the same will be the case with the secondary conduction current in the coil winding.

*Excitation of the guiding and deflecting fields*

In order to secure a suitable curve shape of the fluxes $\phi$ and $\varphi$, Fig. 1 shows a synchronous motor 65 which is driven from the terminals of the secondary coil 64 and has its rotor poles and stator windings so arranged that by effect of its voltage the desired shape of the transformer flux $\phi$ is produced, for example that shown in the first line of Fig. 5, or indicated in Fig. 8 at the transformer windings 64. In order that this flux is not distorted by a different voltage curve of the network 81, a buffer 82 as described hereinafter is inserted between network and secondary coil.

The same synchronous machine 65 may participate in producing the necessary magnetizing current for the guiding flux $\varphi$. For, as the third line in Fig. 5 shows, this flux can be decomposed into two components of which $\varphi'$ has the shape of the transformer main flux $\phi$. The residual component $\varphi''$, on the other hand, constitutes merely a rectangularly shaped flux. Therefore the exciting current of the guiding flux can be derived from the synchronous machine 65, in addition to a commutated direct current. This is indicated in Fig. 1, where 66 shows a commutator fed by slip rings 67 and driven synchronously by the motor 65 by means of shaft 60, which also may drive the D.-C. exciter 68. By proper phase adjustment of the commutator 66 to the rotor of motor 65 the necessary phase relation of the components $\varphi'$ and $\varphi''$ can be arranged and by means of a mixing network 69 voltages and currents by proper application of impedances are so combined that the addition of the trapezoidal and rectangular components of current can be secured. Thus, the guiding flux $\varphi$ will always have the correct shape and phase position with respect to the transformer flux $\phi$.

In order to switch by reversion of the deflecting forces in the deflector 21 the particle stream from one admission conduit-way to the other such as from 29 to 28 or vice versa the magnetic flux $\delta$ of the deflector must be reversed with the beginning of each new charging period. Thus, the excitation of this flux must follow the curve $\delta$ in Fig. 5, whose shape is identical with that of the rectangular component $\varphi''$. Therefore the excitation of the magnetic deflector also may be taken from the commutator 66, as in Fig. 1.

Hence, the necessary steering operations of the entire electric mechanism of the atomic energy transformer in Fig. 1 can be derived from the same sources of current and thereby becomes extremely simple and reliable.

The deflector energizing circuit, D.-C. exciter 68, collector rings 67, commutators 66, network 69, magnet coils 24, 25, lines 71, thus produces in the deflector core 22, 23 a space field which varies with an alternating rectangular curve shape. As synchronizing means, the synchronous motor 65 is mechanically coupled with the commutator rings 66 thus causing the deflector space field to oscillate in the rhythm of the alternating current. The deflector space field thus steers during one half of each cycle the bundle of particle rays in one direction into the chamber and in the other direction during the other half of each cycle.

The same synchronizing means, motor 65, is coupled over lines 74, the network 69, lines 71 with the steering circuit, coils 24, 25 of the deflector system 21, and, through lines 72, with the guiding circuit coils 47, 48, and, over lines 73, with the magnetizing circuit, coil 64 of the energy transformer, and thus causes revolution and deceleration of the particles in the toroidal chamber in the one sense of rotation during one half of each alternating current cycle and revolution and deceleration in the other sense of rotation during the other half of each alternating current cycle.

Other such synchronizing means than a synchronous machine and a commutator may be used instead. For example, rotating machinery may be avoided by proper use of auxiliary networks containing saturated iron, capacitors, inductors, resistors, and tube devices, as well known in the art.

The flux of the magnetic deflector 21 of Figs. 1 and 3 spreads through trapezoidal pole shoes 26, 27, to a gap in which the deflection of the particle stream is produced. In order to avoid in the nearly homogeneous field between the pole shoes a defect in beam transmission, the entrance and exit of the beam must take place in parallel planes. Hence the entrance and exit edges of the pole shoes are parallel. Only then an incident beam will retain after deflection the parallelism of its rays. The cross section of the beam however may usefully change somewhat as shown in Fig. 1.

In some cases the mixer 69 may simply comprise series and parallel connections as shown in Fig. 8. In this figure the energizing circuits with the control and synchronizing means are shown together with the windings to which they are connected. Here the voltage of the synchronous machine 65 which for itself produces trapezoidal current, and the voltage of commutator 66 which produces for itself rectangular current, feed in series over lines 72 the coils 47, 48 of the guiding field system and produce therein the curve shape of current as indicated by $\varphi$ in Fig. 5 or at the foot of the windings 47, 48. The deflector coils 24, 25, on the other hand, are directly fed over lines 71 from commutator 66 by rectangular current indicated above the commutator in Fig. 8. In order to enforce a rectangular alternating current of the commutator 66 extra self-inductance 70 may be used with the source as shown in Fig. 8, keeping the direct-current constant.

If saturation of iron or the effects of leakage fields, resistance and other losses are substantial, the curve shapes of the currents which produce the fluxes, and also of the voltages which produce the currents, will be somewhat distorted from the pure shapes as plotted here and thus corrective values in the mixing process within the network 69 may be necessitated. Their magnitudes can be simply derived by application of the well-known laws of electromagnetism.

In Fig. 5, the charging and deceleration periods are shown as equal in length of time. The particles which enter the deceleration chamber during the charging periods transfer their energy entirely to the transformer, since all necessary conditions for this effect are fulfilled. However, those particles which enter the chamber later, namely during the decelerating period, do not fulfil these conditions and therefore many of them go astray and do not participate fully in the energy transformation.

*Polyphase deflector action*

In order to make full use of the beam energy during all of the time a second decelerator arrangement may be used, the fields of which are phase displaced by a quarter of a period with respect to the first one. The changes with time of this transformer flux $\phi$ and this guiding flux $\varphi$ are shown in the last two lines of Fig. 5. Both transformer units now are acting in a two-phase manner, utilizing completely the incident energy of the atomic beam. The electric energy of the two secondary transformer coils may be transmitted into a two-phase electric network.

Figure 9:
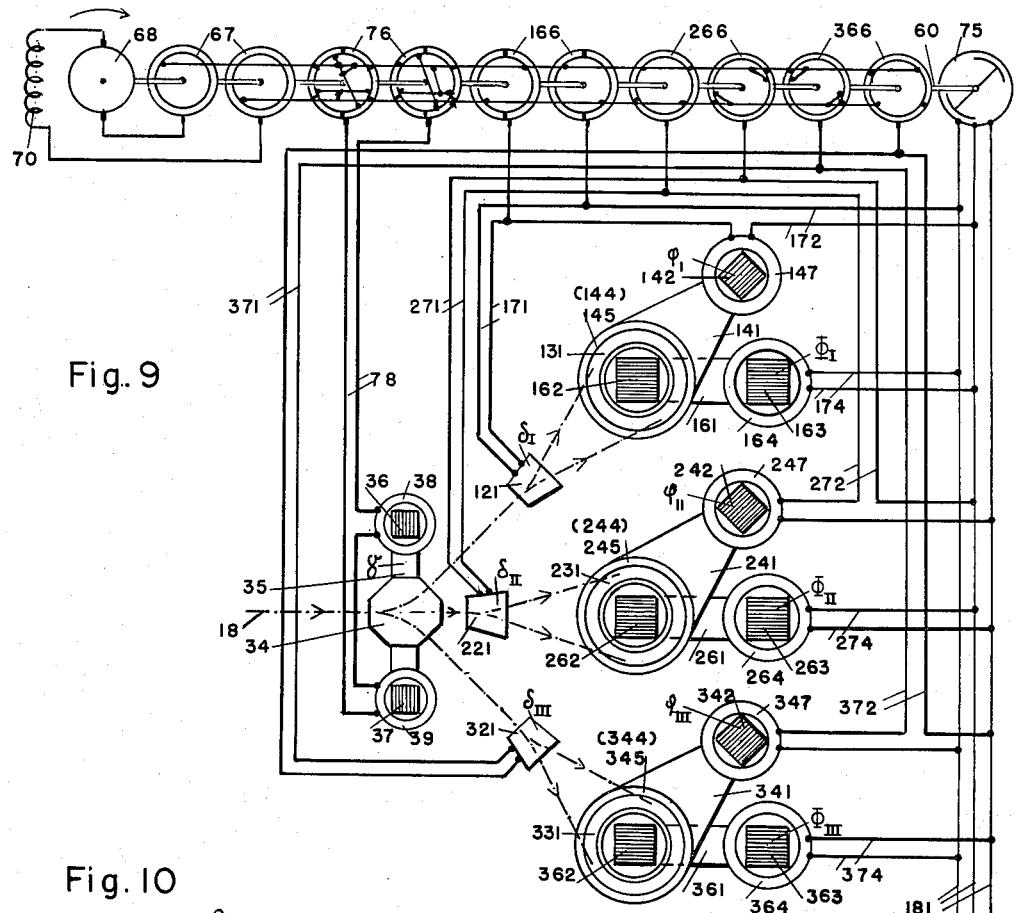
Fig. 9 is a modification of the diagram of Fig. 1 for the conversion of a bundle of particle rays into polyphase alternating current, with the connections of the collector- and commutator-ring parts of the steering, guiding, and magnetizing circuits with control and synchronizing means, the rings being shown in exploded view.
Figure 10:
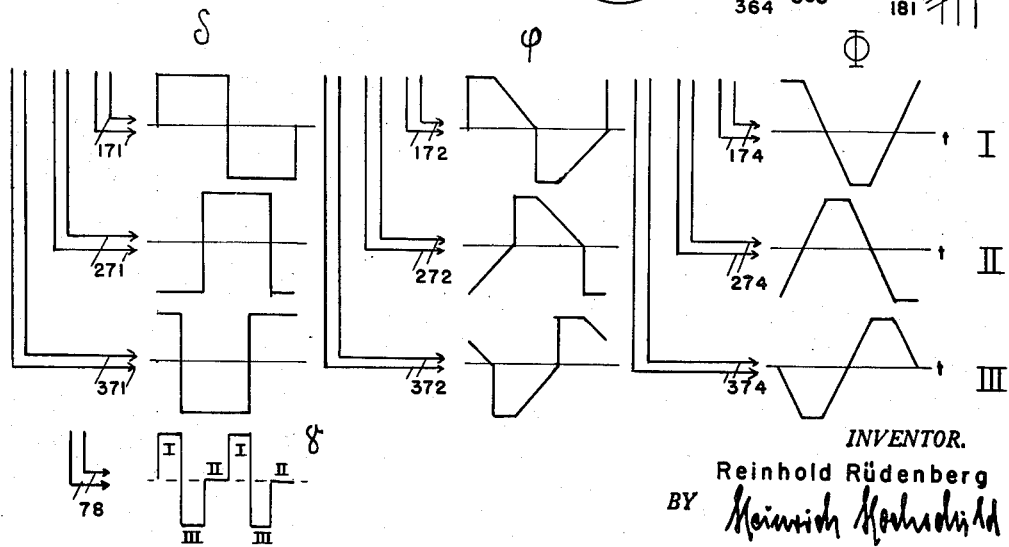
Fig. 10 illustrates the curves showing the courses in time of the various fluxes of the three phases, together with the lines carrying the currents for producing these fluxes.

Fig. 9 illustrates, rather schematically, the diagram of a three-phase system with its various deflecting, guiding, decelerating and energy converting circuits and the appertaining control and synchronizing means, and Fig. 10 shows for the three phases, indexed by Roman letters I, II, III, in the three lines, correspondingly marked, the courses in time of the various main and auxiliary fluxes as controlled by the various commutators, starting from the position of the commutator rings relatively to the stationary brushes as illustrated in Fig. 9, the sense of rotation of the rings illustrated by the arrow.

The coils 38, 39 of a primary or master three-phase deflector with core 35, 36, 37, and pole faces 34, are excited from the direct current exciter 68 over the collector rings 67, commutators 76, and lines 78, with stepped direct current so as to produce in the deflector system a magnetic flux $\gamma$ of a course in time as shown at the foot of Fig. 10.

The magnetizing winding 38, 39 of the master deflector thus is energized in three steps: positive, negative, and not at all, this cycle being repeated twice during one cycle of the alternating current, and being repeated continuously and synchronously with the alternating current, the direct current exciter 68 being driven from the synchronous three-phase motor 75 which is connected to the alternating current network 181.

In accordance with the three steps of excitation of the steering circuit, the three-phase deflector 35 directs the incident bundle 18 of particle rays into three directions, alternatingly into the three secondary deflectors, thus deflects it to the deflectors 121, 321, and lets it pass straight to deflector 221.

These secondary deflectors 121, 221, 321, are energized and steered as Figs. 9 and 10 illustrate likewise from the direct current exciter 68 over collector rings 67, lines 171, 271, 371, under the control of the commutators 166, 266, 366, respectively. Fluxes $\delta_I$, $\delta_{II}$, $\delta_{III}$, Fig. 10, are thus produced in the secondary deflectors. Each of these fluxes $\delta_I$, $\delta_{II}$, $\delta_{III}$, deflects into the appertaining of the toroidal chambers 131, 231, 331, respectively, once within each alternating current cycle in the one sense of rotation and once in the other sense of rotation, the bundle of particle rays, which arrives from the primary deflector once within each alternating current half-cycle and for a length of time given by the corresponding steps of the $\gamma$ curve, shown at the foot of Fig. 10.

In the toroidal chambers the particle beams are subjected each, correspondingly as shown in the first three lines of Fig. 5 with reference to Fig. 1, to a guiding space field, $\varphi_I$, $\varphi_{II}$, $\varphi_{III}$, respectively, see Figs. 9 and 10, by means of the guide field systems, cores 141, 142; 241, 242; 341, 342; ring shaped poles 144, 145; 244, 245; 344, 345; and excited windings windings 147, 247, and 347, respectively.

As Fig. 9 exemplifies, the guiding windings 147, 247, 347, are energized over lines 172, 272, 372, respectively, from the direct current exciter 68 in series with the synchronous machine 75 under the control of the commutators 166, 266, and 366, respectively. The guiding fluxes $\varphi_I$, $\varphi_{II}$, $\varphi_{III}$, are thus produced. Simultaneously, the particles in the toroidal chambers, are subjected to the decelerating main fields $\phi_I$, $\phi_{II}$, $\phi_{III}$, excited by the secondary windings 164, 264, 364 of the energy transformers 161, 162, 163; 261, 262, 263; and 361, 362, 363, respectively, these secondary windings being connected over lines 174, 274, 374, with the synchronous machine 75 of the alternating current network 181, thus feeding the transmuted atomic energy into this polyphase network.

In comparison with the one-phase system of Fig. 1 and the corresponding flux curves of the first four lines of Fig. 5, the charging period in each phase is shortened and the decelerating periods extended as the three main transformer fluxes $\phi_I$, $\phi_{II}$, $\phi_{III}$, in Fig. 10 illustrate. Now the particle stream will charge the first toroidal chamber during ⅛ of a cycle and then the deceleration will last ⅜ of a cycle, after which another charging period and deceleration of opposite sign follows, also of ⅛ and ⅜ of a cycle, respectively. During these periods of ⅜ of a cycle each, the original beam of constant intensity is free for work in the other two toroidal chambers so that the charging periods of the three vacuum chambers, 131, 231, 331 may follow each other consecutively. Thus the entire energy of the particle beam is transformed into electric three-phase energy under optimum conditions.

The paths of the beam thus changing between six different directions are indicated by the dash-dotted center rays, emerging as a bundle 18 of particle rays from a condenser as in Fig. 1 and ending in the three annular deceleration chambers 131, 231, 331 of Fig. 9. The particle streams in the chambers are guided by the fields, $\varphi_I$, $\varphi_{II}$, $\varphi_{III}$, respectively, with ⅓ cycle phase-displacement between one another. The particle streams in these chambers feed inductively their secondary coils by interaction of the main fluxes $\phi_I$, $\phi_{II}$, $\phi_{III}$, excited from the synchronous machine 75 also with the proper phase-displacements, and this energy is supplied in three-phase manner to the busbars 181 of the load.

Figure 11:
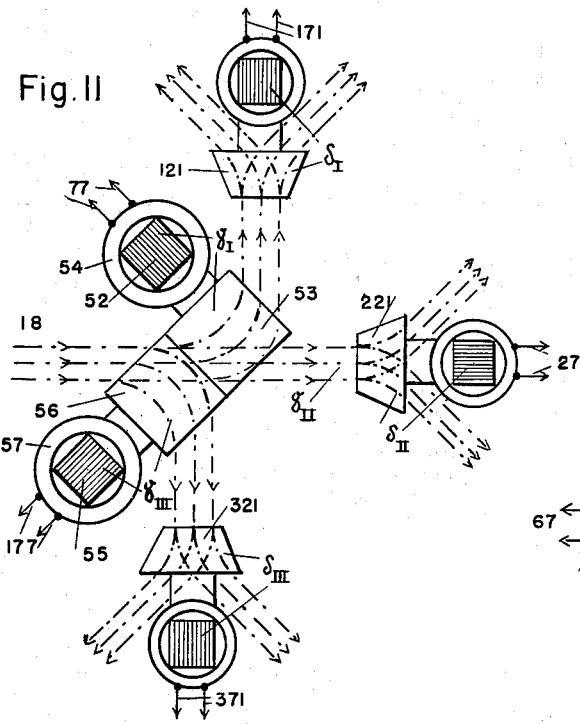
Fig. 11 is a diagram of a modification of a three-phase deflector system with master and secondary deflectors.

Another embodiment of a deflector arrangement is shown in Fig. 11. The master deflector consists of a two part deflector with cores 52, 55, pole faces 53, 56, and exciting windings 54, 57, respectively. By feeding the windings 54 and 57 from the direct current exciter 68 under the control of two commutator rings 77, 177, such as diagrammatically shown in Fig. 13, the flux distributed in time over the composite deflector will show the same course and so will the fluxes $\delta_I$, $\delta_{II}$, $\delta_{III}$, $\varphi_I$, $\varphi_{II}$, $\varphi_{III}$, and $\phi_I$, $\phi_{II}$, $\phi_{III}$, as illustrated in Fig. 10.

Figure 12:
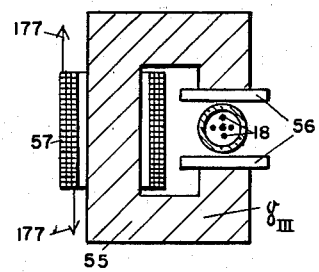
Fig. 12 is in diagrammatic view an elevation of one constituent part of the master deflector of Fig. 11.
Figure 13:
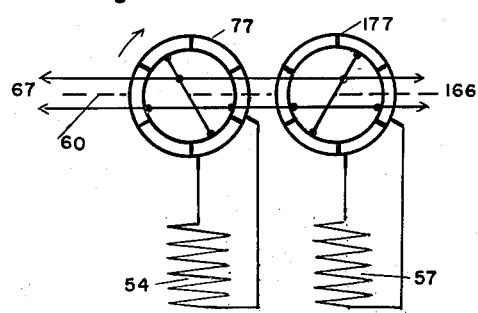
Fig. 13 is a diagram of the commutator ring connections of the master deflector of Fig. 11 showing the commutator rings in exploded view and the curves of the fluxes controlled by the commutator rings.

Thus, the beam emerging from the condenser 15, Fig. 1, impinges first on the three-phase deflector $\gamma$ its two electromagnets being excited alternatingly with a pause therebetween, as the curve at the foot of Fig. 13 illustrates. In each of the deflector elements, one being shown in elevation in Fig. 12, the beam 18 enters and leaves the nearly homogeneous air-gap field through parallel edges of the pole shoes 53, 56, respectively. With constant radius of the circular deflection orbits, this condition secures that an incident parallel beam of considerable width will also emerge with parallel rays. In Fig. 11 the beam is shown as deflected by $\gamma_I$ to the left when the exciter coil 54 is energized as Fig. 13 illustrates. The beam enters the A.-C. deflector $\delta_I$ to be directed to one way of the two-way conduit and into the appertaining toroidal chamber such as 131 of Fig. 9.

After $\frac{1}{6}$ cycle, the three-phase deflector element $\gamma_I$ is de-energized and remains so through next $\frac{2}{6}$ cycle. The deflector element $\gamma_{III}$ is now energized in the opposite sense as the first one was through the energizing of coil 57, see Fig. 13. Since the deflector element $\gamma_{III}$ is built like the first one with parallel edges of the pole shoes for the incident and the emerging rays, these rays remain parallel. The beam now enters the A.-C. deflector $\delta_{III}$ of the third phase where it is treated in the same way as described above, and will be directed into the appertaining toroidal chamber such as 331 of Fig. 9. In the next, the third, $\frac{1}{6}$ cycle none of the composite deflectors is excited. The particle beam, therefore, moves now straight on into the A.-C. deflector $\delta_{II}$ of the second transformer phase to be directed to one way of its two-way injector conduit 28, 29 of its chamber, such as 231, Fig. 9. In the fourth $\frac{1}{6}$ cycle the deflector element $\gamma_I$ again directs the beam into the first A.-C. deflector and transformer phase which now, after change of its polarity— see the $\gamma$ curves of Fig. 13 and the $\delta$, $\varphi$ and $\phi$ curves of Fig. 10—swings the beam to the other side of the conduit and thus into the side of its decelerator opposite to that into which it was deflected before. The same process will occur in the fifth and the sixth $\frac{1}{6}$ cycles with the beam again falling on $\delta_{III}$ and $\delta_{II}$ in Fig. 11.

Hence, if the three secondary A.-C. deflectors of the individual transformers are operated as the curves $\delta$ indicate for the three phases in Fig. 10, and the three-phase master or primary deflector is operated as the curve $\gamma$ in Fig. 13 shows, then each of the three annular chambers 131, 231, 331, or orbital spaces of the three-phase transformers 141, 241 and 341 will be alternatingly and successively charged with particles and thus with a convection current through periods of $\frac{1}{6}$ cycles each and thereon the particles will be decelerated through periods of $\frac{2}{6}$ cycles each, as indicated by the $\phi$ fluxes of Fig. 10.

A source or carrier of radiant atomic energy with separator, collector and condenser as shown on the left-hand side of Fig. 1, and a three-phase master deflector with three A.-C. secondary deflectors as shown in Figs. 9 and 11, and after these the three decelerator transformers with main and guiding fields, conduits, annular vacuum chambers and secondary coils as illustrated in Fig. 9, all excited as shown in Fig. 10, will thus constitute a complete three-phase assembly by means of which atomic energy may be transformed directly into three-phase commercial electric power.

Curve shape of fluxes

A three-phase arrangement with flux curves as shown in Fig. 10 has the advantage, compared with a two-phase system with the flux curves of the last two lines of Fig. 5, that the charging periods are shorter and the braking periods are longer. Longer braking periods give the deceleration voltage more time to retard gradually to zero the particle stream which enters the toroidal chambers with enormous velocity. The transformer may thus be built with a smaller flux and lighter core. The shorter charging periods limit the total energy charge admitted to the vacuum chamber and therefore reduce the radial forces due to the space-charge of the annular current which tend to drive the charges against the wall before their energy is fully exploited.

A further reduction of the charging time and extension of the braking time may be attained by using more than three phases, such as six phases, Fig. 6 showing for a 6-phase example the shapes of the main flux $\phi$ and the guiding field $\varphi$ of one of the decelerating transformers.

An energy transformer as described, will work usefully even if a sinusoidal change with time of the main flux is employed as shown by the $\phi$ curve in Fig. 7. In this case, the curve shape of the guiding field should consist of chopped parts of a sinusoidal wave as shown by $\varphi$ in the second line of Fig. 7. By such a relation of the curve shapes a deceleration of the particles at a constant radius of rotation can be secured. Since this field consists of the superposition of a sinusoidal and a rectangular curve, the magnetization of the guiding flux may be produced in exactly the same way as shown by the D.-C. commutator and the synchronous machine in Figs. 1 and 9 except that the synchronous machine may operate now with sinusoidal current. In this case, therefore, no buffer 82 between transformer and a sinusoidal network will be necessary. Now, during the charging period near the amplitude of the $\phi$ curve, both the fluxes in Fig. 7 are not exactly constant and thus the entrance condition of the beam is slightly modified and some acceleration or deceleration will occur during the admission.

Figure 14:
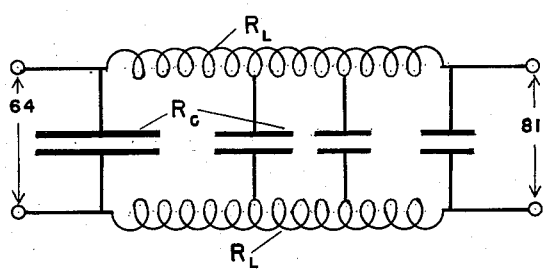
Fig. 14 is a diagram of an inductive and capacitive network to be inserted between energy transformer and alternating current net.

Since the curve shapes of voltage and current in a commercial network never are well defined, the use of a buffer such as indicated in Figs. 1 and 14 is advantageous, such a buffer consisting of inductances $R_L$ between transformers 64 and external network 81 and capacitances $R_C$ between the two conductors of each phase. A capacitor directly connected to the transformer terminals is useful for taking over the sinusoidal components of the magnetizing currents of all the fluxes: main transformer flux, as well as guiding flux, deflector fluxes and even motor flux. In this way, the entire arrangement may be made self-exciting. The additional capacitors, as indicated in Fig. 14, may be tuned to their respective inductances so that a number of higher harmonics in the circuit may be excited by them. In such a way, those voltage and current curves may be secured which are best suited for the operation of the transformer fields as different from those on the network side 81 Fig. 1 or 181 Fig. 9.

Particle lenses

In order to produce a parallel unidirectional beam of charged particles from an atomic source which radiates energy into every direction electron or proton lenses are to be employed. Particle mirrors may be considered merely as a variety of lenses. The types of lenses as known heretofore make use of electric or magnetic fields which essentially are excited externally of the particle orbits. Those lenses are mainly determined for use with narrow beams of small angular apertures. With large apertures, or with rays of wide angles with respect to the axis, however, those lenses show great optical defects which prevent the production of parallel rays from a source of emitting over a solid angle of $4\pi$.

In accordance with this feature of the invention, the charged particles are subjected to space fields generated by polarized electromagnetic or space field producing elements disposed between the trajectories of the particles or within their orbital space.

These lens systems of the invention comprise a multitude of polarized electromagnetic elements disposed within and distributed, in form of an array with interstices between the elements, through and across the space traversed by the particles. In this way, the particles on their trajectories pass through the interstices between the polarized, space field producing elements while they are subjected to the influence of the fields produced by the elements and there will be produced not only greater bending forces on the rays but at the same time proper distribution of these forces is made possible.

If the array of distributed polarized field producing elements is disposed about the carrier of radiant atomic energy within, and distributed over, the space traversed by the particles, such as the lens system 13 of Fig. 1, the particles diverging from the carrier may be deflected into at least one, in the instance of Fig. 1 two bundles 16, 17 of rays directed generally along the common axis of the system.

In any case the array of distributed polarized field producing elements may be disposed as distributed or arrayed over the space traversed by the particles so that the direction and configuration of the paths of the electrically charged particles may be controlled at will.

Thus all the rays may be bent to diverge from or converge to a common focus lying anywhere on the axis. The space lenses 13, 14, 15, shown on the left hand side of Fig. 1 are of this type.

The cross-sections of the lens systems 14 and 15 are the same as shown by Fig. 4 for the lens system 13.

In the lens system of this instance, the field producing elements are, as the cross-section through these systems, Fig. 4 illustrates, in fan-like spread meridian disposition about the common axis. The polarized field producing elements in these embodiments are constituted by wedge-shaped permanent magnets 19, symmetrically arranged around the axis, and held together by convenient means, such as a non-magnetic ring 20 as Fig. 4 indicates. The wedge-shaped elements, extended in meridian planes are so magnetized in circumferential direction that North poles and South poles follow each other in the same rotary sense. A circular magnetic field, indicated in Fig. 4 by a dashed circle is thus established about the common axis.

The strength of the field along the meridian plane may be constant or may change dependent upon the configuration of the polarized field producing elements, or here the wedges, or upon the distribution of the remanent magnetism over the wedges. If all the wedges over their entire volume are magnetized to the same remanent field-strength the magnetic induction throughout all wedge-shaped gaps between the magnets will be constant. Such an arrangement will constitute a simple and efficient form of a magnetic particle lens. Its use for various purposes is indicated on the left-hand side of Fig. 1 where different meridian sections of the lens elements are represented. Since the magnetic induction of the lenses is circumferential, the particle orbits here will be curved in any meridian plane.

In the bundles or beams of charged particles the outer rays need to be deflected by the lens more than the inner rays as is indicated in Fig. 1 by the paths of the particles through the various lenses 13, 14, 15. This may be effected by a magnetic field strength increasing with the radius. With permanent magnets it is difficult to increase the magnetic field strength to a high degree.

This difficulty may be overcome by using, as the lenses 13, 14, 15 illustrate, meridian contours of the lenses which are longer for the outer rays than for the inner rays, and by employing in the outer parts of the lens moderate field strengths, of the same order of magnitude as in the inner parts. While then the deflection of the rays near the "optical" axis is completed within a short length of the trajectories, the deflection of the outer rays will develop over a longer part of the trajectories. The rays may thus be deflected into parallel, or into converging, or into diverging rays, convergence or divergence being also determinable by the polarity of the lens elements relatively to the polarity of the particles and the direction of their movement.

Use of constant circular field strength over the radial extension of the wedge-shaped gaps between the wedge-shaped magnetic elements, thus independent of the radius, has the further advantage that the paths of the deflected, charged particles are circular within the lens without substantial aberration.

This characteristic of the lenses with homogeneous field strength makes it easily possible to determine from the entrance and exit conditions of the rays the contour of the elements which constitute the lens.

The velocity of the individual rays of the beam inside the lens will remain as homogeneous, and the rays will leave the lens with a velocity as homogeneous as the velocity was when the rays entered the lens, since in such homogeneous fields the charged particles are deflected on circular orbits without any change of velocity.

Particle separator lens

The particle separator 13 in Figs. 1 and 4 consists of such a lens, each element 19 having a meridian section as shown in Fig. 1. Charged particles emerge from the origin or carrier 12 in all directions, traverse in circular paths the constant magnetic field, which everywhere circulates around the axis and directs positively charged particles to one side, negatively charged particles to the opposite side. The radii of the orbits in the meridian plane are determined by the particle momentum and the magnetic induction. The circular orbits are limited and the lens ends where the rays become parallel to the axis, so that a parallel beam will emerge. Thus the outer radius of this toroidal lens is equal to twice the radius of the orbits and the contour of the lens elements in the meridian plane is circular. Hence the necessary dimensions of the lens are given by the two parameters just mentioned. If material of high magnetic remanence is selected for the wedges, sufficient space will remain between the magnetic sectors to let a considerable part of the entire particle energy emitted at the origin emerge from one or both sides of the lens in a parallel beam.

If a converging or diverging beam is to emerge from the lens, or if a free space should be necessary around the source or carrier, the shape of the meridian section of the lens will differ from that shown in Fig. 1 but it will always be easy to determine this shape from the entrance and exit conditions of the particles. In case the positive and negative particles are emitted with essentially different velocities or momentums the right-hand and left-hand parts of the separator lens 13 must be arranged with different diameters proportionate to the momentums.

Collector and condenser lenses

The collector lens 14 in Fig. 1 is built up of sector wedges the same as the separator lens 13. However, the meridian section is different in order to force paralleel rays incident upon one side of the lens to emerge from the other side converging towards a focus. Since within the lens because of the constant magnetic induction the orbits again are circular, the shape of the exit boundary may uniquely be designed for any given entrance area. The condenser lens 15, Fig. 1, is a diverging lens circumferentially built up in the same way as lenses 13 and 14 but is of another shape in the meridian plane and of a direction of magnetization opposite to that of the two other lens systems. Lens 15 transforms the incident converging rays into an emerging bundle 18 of parallel rays. With such sequence of lens systems, the rays originally emitted from the source or carrier to all sides of the space may be directed into a highly concentrated beam of small dimensions. Since all the lenses, as just described, are built up of similar magnetic wedge elements, some or all of them may be combined to a common structure, the paths of the particles through this common structure being composed of circle segments.

Figure 15:
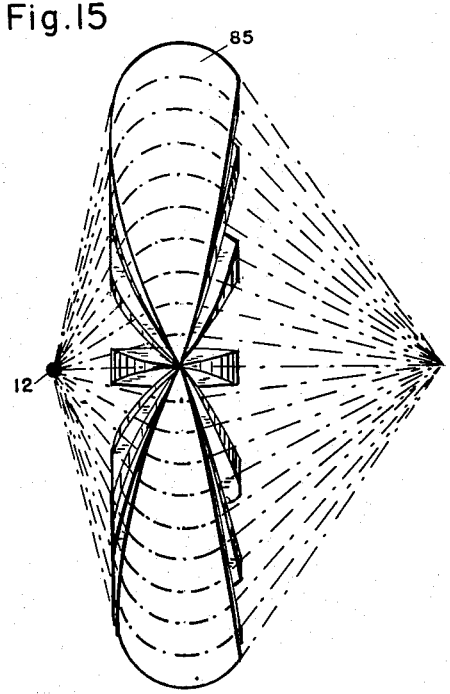
Fig. 15 is in diagrammatic view a longitudinal section of a modification of a space lens system comprising permanent magnetic elements.

On the same basis many other schemes using such particle-optical effects may be devised for the same purpose by means of lenses having magnetic lines of force circulating around the axis. For example, in Fig. 15 a lens 85 is shown on one side of the source or carrier. This lens focuses a great part of its radiation into a definite point. If the magnetic induction is constant within the lens space, the particle orbits again are circular and of equal radius and the shape of the meridian lens area may thus be determined. Of course, such a lens shape would utilize only the radiation from the source into one hemisphere and even not the entire amount of the radiation into this hemisphere. However, by extending the meridian cross-section over into the other hemisphere, any desired amount of the radiation may be captured and transformed into a unidirectional beam around an axis.

It is characteristic of all space field producing lenses with constant field strength that their dimension measured along the orbits will be greater for the edge rays than for the rays nearer to the axis since the outer rays are to be bent over a larger angle than the inner rays. Since the magnetic field does not change the velocity of the particles, all rays, whether parallel, or converging to, or diverging from, a focus, retain their original property of equal velocity.

Electrically excited lenses

In another embodiment of the lenses of the invention, electric currents are employed to excite circular magnetic fields around an axis, of constant or varying induction along the radius. Such an arrangement is particularly advantageous if the strength of the lens must be changed or it may also be used in addition to permanent magnetic fields if these need an adjustment of their strength.

The lens system in this development of the invention, comprises an array of flat coils, generally designated in Figs. 16 and 17 by 86. These coils are distributed, fan-like spread as Fig. 17 illustrates, over the space traversed by the particles and meridian planes about the common or "optical" axis. The coils are connected at their terminals 87 to a source of current.

In this way a circular magnetic field about the axis may be produced. By proper distribution of the local current density within the space of the lens, any desired dependence of the magnetic induction upon the radius of the lens may be provided.

In the example of Figs. 16 and 17, the coils consist of turns 88, 89, 90, which include conductors 91, 92, 93, distributed as an array over and across the meridian planes and when connected to the source 87 carry current in the one direction. These coils further include conductors 94 disposed outside the space traversed by the particles, for closing back the conductors disposed inside this space.

Both these types of conductors 91, 92, 93, and 94, are shaped so as generally to follow with their meridian contours the trajectories of the particles.

This example is shown for constant mean current density along the radius so as to produce constant field strength over the entire lens. This will produce the simple circular particle orbits of equal radii as shown in the foregoing example of permanent magnetic lenses. The outer meridian contours of the coils thus follow curves as were necessary in the above described magnetic examples for various purposes of the lens, here in the example of Fig. 16 for converging a parallel ray towards a focus. Fig. 17 indicates by dashed circles the magnetic field distribution.

Electrostatic fields

In all the examples up to now described, the influence exerted on the particle rays was performed throughout by magnetic fields. The main object of this energy transformer, namely the transformation of atomic radiant energy into alternating-current energy can be performed only magnetically. For, there is no alternative to the use of Faraday's induction law, which here is employed for the transfer of energy from a rotating decelerated particle beam into electric current flowing in metallic conductors around a common magnetic flux. However, all the other operations used for the steering and the control of the particle beam consist merely in bending or deflecting the rays from a straight line into orbits useful for producing the effects described hereinabove. To this purpose, as an alternative to magnetic forces, electrostatic forces may also be used, a use which in some respects is advantageous compared with the use of magnetic forces.

Electrostatic space lenses

Electrostatic space lenses may be built up as will now be set forth with reference to Figs. 18 to 21. In order to produce electrostatic fields for controlling the direction and configuration of the paths of the electrically charged particles, an array of conductive elements is disposed within and distributed over the space traversed by the particles and these elements are electrically charged and polarized.

In the examples of Figs. 18 to 20 the conductive elements are of annular shape and are disposed about the axis of, and across the space traversed by, the bundle of particle rays and follow in their disposition the trajectories of the particles.

In the example of Figs. 18 and 19 an array of co-axial wire rings 95 is displayed over the lens space as shown in Fig. 18. The rings are charged electrically so as to produce in the meridian direction an electric field which deflects the incoming particles. In order to avoid too many collisions of the particles with the electrodes, the electrodes are suitably arranged along fictitious or the desired orbits, for example on circles as illustrated in Fig. 18 where four series of such rings are shown. The voltages of the various rings favorably will be so chosen that the deflecting forces are always perpendicular to the orbits in order to avoid a gain or loss of energy of the particles. If circular orbits are chosen, as shown in Fig. 18, the necessary voltages may be taken from a voltage divider 96 schematically indicated in Fig. 19, the various rings and their voltages being indicated in both figures by numerals i. e. 1 to 5, of the first or inmost group, 1' to 8' of the second group, 1'' to 12'' of the third group, and 1''' to 12''' of the fourth or outmost group.

It is a straightforward process to choose all the ring voltages, beginning with those near the axis, so that the deflecting voltage differences measured at various places on paths perpendicularly of the orbits give the values necessary for the curvatures of the orbits at those places. For circular orbits the field strength must be constant in magnitude and thus, measured along a path perpendicularly of the orbits, the voltages between any two nearest rings, one each of any pair of circular groups, should be proportional to the distance between these rings. In Fig. 18 four series of rings are shown within the array. However, the greater the number of the rings and the series the better will be the accuracy of the lens action. Fig. 18 represents a lens for use as a collector for particles of equal sign emitted from a carrier of radiant atomic energy. The rays are bent into a parallel beam to be used subsequently as indicated in Fig. 1.

The conductive elements may also be hoods or calottes as shown at 97 in Fig. 20 to be used for building up electrostatic space lenses for converging a beam of parallel rays towards a focal point. Such electrodes, increasingly charged by potentials according to the numerals (1 to 5) shown, constitute equipotential surfaces which are to be shaped and arranged so that they exert electrostatic forces perpendicular to the orbits. In this case the electrodes will constitute fictitious orbits and thus will not be unnecessarily hit by particles. Since now the same voltage is active between every two electrodes and the rays are essentially parallel to the electrodes, the rays will converge towards the focus. Thus their mutual distances will decrease and the field strength will increase with approach to the axis. The curvature of the orbits will thus increase towards the axis and no circular orbit is possible within the lens space. However, it is a straightforward process to determine the exact shape and the boundaries of such multiple equipotential lens electrodes for any desired converging or diverging effect on the particle rays.

Such electrostatic lenses may be employed for the lens systems designated by 13, 14, 15 in Fig. 1 in order to transform particle rays emitted in all directions into a narrow unidirectional beam. Electrostatic forces may also be used for separating positive and negative particles emitted from a source as shown in Fig. 21. Here a high voltage ±E is applied to two grids 98, 99, placed on opposite sides of the source. Each charged grid attracts the particles of opposite sign and repels those of like sign so that orbits will develop as indicated in Fig. 21. In a nearly homogeneous field, these orbits are of parabolic character and therefore spread out to large distances from the axis, if not extremely high grid voltages are used. Furthermore, the particles will gain in velocity under the effect of the opposite electric forces and their increased energy later on is to be utilized. Thus, a part of the power produced as A.-C. energy in the transformer is to be rectified and led back to the high voltage grids. For these reasons, it appears more suitable to use a magnetic separator, as described above, near the source or carrier of atomic energy.

In case the atomic source emits neutrons, it seems possible to charge artificially the source to a high positive or negative electric potential, so that the neutrons may be deflected by electric or magnetic fields and their energy of motion thus exploited for the production of useful electric energy in the apparatus of the invention. The voltage of charge for this purpose should be high in view of the velocity of the neutrons so as to create bending and decelerating forces of a considerable magnitude without application of too intense magnetic or electric fields.

*Electrostatic deflecting and guiding space fields*

The deflection of the particle beam either in an A.-C. deflector or in a three-phase deflector may also be produced electrostatically, as shown in Figs. 22 and 23, between polarized cylindrically shaped electrodes 100, 101; 102, 103. By use of a rectangularly alternating voltage, as indicated by δ or γ in Fig. 10, admitted through appropriate network means such as 66, 71, Fig. 1, and through commutators as in Fig. 1 now fed by constant voltage from the direct current source, the electrodes may be polarized in the following sequence:

| 100:+ | 101:− | 102:− | 103:− |
| 100:− | 101:− | 102:+ | 103:− |
| 100:0 | 101:0 | 102:0 | 103:0 | thus deflecting the particle stream, under maintenance of its parallelism, successively to the left, to the right, and not at all, thus in three different directions 29, 28, and 30.

Such three-way or two-way deflectors may be used in place of the magnetic deflectors of Figs. 1, 4, 6, 8 and 9. The advantage is a smaller time constant which makes possible a sharper action when the direction of the beam is changed.

Figs. 24 to 27 show examples of energy transformers wherein the guiding space fields are electrostatic fields. The polarized electromagnetic elements are in the form of concentric conductive electrodes 106, 107 of substantially cylindric shape leaving between themselves the gap wherein the toroidal space of the vacuum chamber 31 is enclosed.

The steel cores 61, 62, 63, Figs. 24 and 25, and 111, 112, 113, 114, Figs. 26 and 27 for the magnetic main flux $\phi$ are linked on the one hand with the secondary coils 64 and on the other hand with the revolving particle beams. The particles are guided around the flux $\phi$ by the effect of an electrostatic field which extends radially between the two concentric cylinders 106 and 107 charged electrically with opposite polarities. A variety of field distributions may be arranged by shaping the inner and outer cylindrical electrodes 106, 107 not strictly cylindrically but entirely or partly with a tendency to the shape of either ellipsoids or hyperboloids. The particles are injected into the toroidal vacuum chamber between the electrodes in a similar way as hereinabove described.

In this embodiment a large space may be filled with particles during the charging period because the extension of the guiding field in the axial direction is not restricted in contrast with the magnetic guiding field of Fig. 2 where the height of the air gap is limited. Thus the density of the space charge may be chosen much smaller here. Moreover, much simpler than the built-up of a heavy electromagnet producing the guiding magnetic flux through a considerable length of the air gap is the provision of two high-voltage electrodes arranged coaxially within or outside of the vacuum chamber or forming an axially extended part of its wall.

The electrostatic field $\varphi$ and therefore the voltage between the electrodes is to follow a similar curve shape with time as shown by the $\varphi$ curves of Figs. 5, 6, 7 or 10 in order to guide the particle stream around the changing magnetic flux $\phi$ on a constant or nearly constant radius. Only the descending parts of the $\varphi$ curves will be modified dependent upon the velocity of the particles. With velocities near to that of light, the well known relativistic interrelations between velocity, mass, and momentum are to be applied for the determination of the proper value of the guiding field, be this field electrostatic or magnetic.

The change of the guiding voltage may again be produced by two components $\varphi'$ and $\varphi''$, Fig. 5, derived from a smoothly alternating voltage and a commutated or rectangular voltage, as was hereinabove described for the currents where the two components were produced by means of the electric circuits set forth with reference to Fig. 1.

*Coaxial coils*

Figure 27:
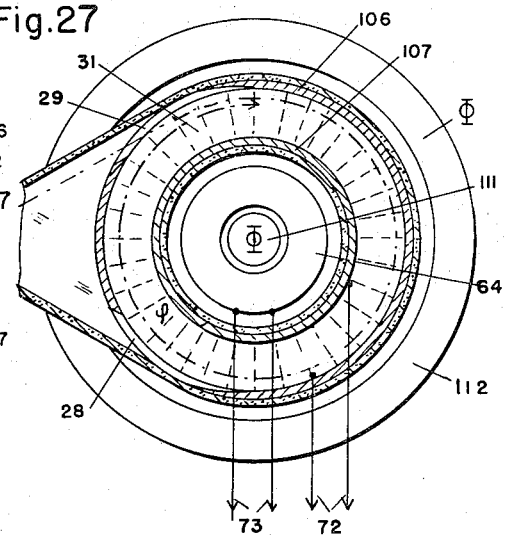

Figs. 26 and 27 show an embodiment of the feature of the invention where the secondary winding 64 of the energy transformer and Figs. 28 to 31 two embodiments where part of the secondary winding 165, is disposed about a leg of the core of the energy transformer and coaxially with the toroidal chamber.

In the case of a magnettic guiding field system where the polarized electromagnetic elements are magnet poles, the poles may be shaped with annular magnetic pole shoes 44, 45, confining between them the gap which contains the toroidal chamber. Through the circular openings of the pole shoes and that of the toroidal chamber, as Figs. 28, 29 and Figs. 30, 31 exemplify, a leg, 117 and 124, respectively, of the core of the energy transformer and at least part of the secondary winding 165 are extended.

In this arrangement, as illustrated in Figs. 26 to 31, the secondary coil which carries the induced alternating current is disposed as close as possible to the primary particle or convection current and preferably so that the secondary and primary current are spread out to some extent perpendicularly of the direction of the guiding field. This arrangement has the advantage of avoiding the following defect.

If the energy transformers such as illustrated in Figs. 1 and 2, and Figs. 24 and 25 would work at no-load the main field $\phi$ and the guiding field $\varphi$ were the only magnetic or electric fields present in the particle decelerator. However, if the transformer is loaded, a considerable secondary conduction current and primary convection current circulate around the main flux $\phi$. These produce armature reaction or leakage fields in the space between the two currents, for example, in the electrostatic decelerator shown in Figs. 24 and 25. The leakage field of the secondary current is unsymmetrically located with respect to the guiding field of the primary current. Therefore, it will greatly disturb the guiding effect, and thus the particles will considerably deviate from their prescribed paths. A similar action occurs in the magnetic decelerator shown in Fig. 2. Here, in addition, the primary current produces fields in the guiding gap which are of one direction in the inner space of the particle ring current, and of opposite direction in the outer space. Therefore the guiding field will be greatly distorted, resulting in a deviation of the particle orbits from their prescribed paths.

This defect is avoided by winding the secondary coil coaxially with the particle stream in the annular vacuum chamber and thus disposing the secondary winding of the energy transformer coaxially with the toroidal chamber about the same length of the transformer yoke.

In the arrangement shown in Figs. 26, 27 for a decelerator with electrostatic guiding field, both currents flow concentrically around the center leg 111 of the main transformer flux $\phi$. The secondary coil 64 is wound directly around this leg and the electrostatic guiding field $\varphi$ surrounds radially this coil, causing the particle stream to rotate on a relatively large radius. This is advantageous for the transformation of a maximum amount of energy under limited electric field strengths. The magnetic flux may be closed by two or more external limbs and yokes, which, for perfect symmetry, may entirely surround circumferentially the coil and the vacuum chamber as Figs. 26, 27 illustrate at the outer cylindrical yoke 112 and the top and bottom yokes 113, 114, respectively. Since now the secondary current is closely coupled with the primary particle stream, the axial extension of the secondary current will through the effect of the mutual magnetic induction cause a similar extension of the primary particle stream.

In order to reduce further the magnitude of the leakage fields and improve the symmetry within the toroidal chamber, it may be advantageous to arrange the secondary coil in two halves, the one inside the other outside of, and both coaxial with the primary convection current.

Compensating winding

In accordance with a further development of the invention the magnitude of the leakage fields may be reduced and the symmetry within the toroidal chamber be improved by the arrangement of a compensating winding.

In the particle decelerator with magnetic guiding field where the pair of polarized electromagnetic elements is a pair of annular magnetic pole shoes, such as 44, 45, in Figs. 28 to 31 and where the core, 117 and 124, respectively, of the energy transformer and part, 165, of its secondary winding are extended through the circular openings of the annular pole shoes and through the circular opening of the toroidal chamber, 31, another part, 134, 135, of the secondary winding, which part is to serve as compensating winding, is spread over the faces of the pole shoes 44, 45, which face the toroidal chamber 31.

The magnetizing coil 165 surrounds directly the center core of the transformer flux $\phi$. This position is useful for that part 165 of the secondary coil which magnetizes the flux, whereas for obtaining the minimum amount of leakage fields and armature reaction under load it is advantageous to arrange along the faces of the poles which create the guiding field that part of the secondary coil, namely the energy winding which carries the load currents.

In the examples of Figs. 28 to 31 the energy winding is constituted by two spirally wound coils 134, 135, located, concentric with the toroidal chamber, in or near the gap between the guiding poles 44, 45. The coils 134, 135 may be embedded in slots of the iron poles. In this arrangement of Figs. 28 to 31 the secondary current enters at the outer side of one spiral coil, flows through this coil to the inner side, enters there the other spiral coil through which it returns to the outer side, circulating in the same direction as before. In this way, the energy winding serves at the same time as a compensating winding and prevents the creation of an armature reaction field between primary and secondary currents and neutralizes the distorting effects of both of these currents on the guiding field.

It is irrelevant whether the spiral windings are electrically connected in series or in parallel, or whether they form one, two, or more coils in the center plane or to the sides of the vacuum chamber. They should always give, however, a maximum possible symmetrical effect. If part coils are used, they must circulate their currents in the same direction around the transformer flux $\phi$, and their ampere turns always must be equal to those of the particle stream with which they are closely inductively coupled. Then these coils will deliver to the power network 81 in Fig. 1 exactly that amount of energy which is fed by convection and freed by deceleration of the particles in the toroidal vacuum chamber. The spreading of the compensating secondary energy winding over the guiding pole faces causes, by close mutual induction, the particle stream also to spread out over the same radial width. This will avoid the detrimental effects of a space charge too concentrated. The width of the gap may now be chosen constant without undue instability of the particle stream.

The magnetizing coils 165 in Figs. 28 to 31 may be fed by the synchronous machine 65 in Fig. 1 and the compensating energy windings 134, 135 may feed into the network 81 so that independent voltages may be used for the two windings. Or both windings may be connected in parallel either directly or inductively by transformers. In any case the secondary energy current produced in the decelerator should flow in the compensating winding 134, 135 and the magnetizing current needed for creation of the flux $\phi$ should flow in the winding 165 directly surrounding the core. These two currents will be displaced as to their phases by about ¼ of a cycle.

Combination of fluxes

With such a distributed compensating secondary energy winding the energy currents are separated from the magnetizing currents. The iron paths of the two fluxes may be partly combined in order to save material and losses. Whereas in Figs. 2 and 28, 29 there are two cores each, namely 42, 44, 45 for the guiding flux $\varphi$ and 117, 63 for the transformer flux $\phi$, closing these two magnetic circuits separately, Figs. 30, 31 show an embodiment where two of the cores are combined in part. The embodiment as shown in Figs. 30, 31 is suitable for rigorously symmetrical arrangement in which thus perturbations of the particle orbits by any geometric assymetry are avoided.

Here the energy transformer is a body generally of rotational symmetry including an inner center leg, 124, and a peripheral shell, 125. The secondary magnetizing winding 165 is disposed on the center leg 124 whereas the pair of polarized electromagnetic elements, here in the form of magnetic pole shoes 44, 45, and the toroidal chamber 31 therebetween, are disposed so as coaxially to surround the center leg 124 and the secondary magnetizing winding 165 thereon.

The main transformer flux $\phi$ thus flows through a central core surrounded by its magnetizing coil 165. On both the upper and lower sides the main flux spreads out radially through top 127 and bottom 126 of the peripheral shell, by-passing the compensating energy winding 134, 135, and returning through the externally closed concentric yoke or peripheral shell 125.

The guiding space field system includes a magnetizing winding 130 disposed inside of and adjacent to the peripheral shell 125. The guiding flux $\varphi$ thus flows through the toroidal vacuum chamber 31 and the secondary winding spread out in compensating coils 134, 135 over the pole faces and is closed through the same external yoke as the main flux. This yoke therefore carries the difference of both fluxes and may be magnetically excited according to this difference $\phi-\varphi$. This difference is provided by the concentric coil 130 located in the space between the toroidal chamber 31 and the external yoke 125.

In order to arrange for a large circumference of the rotating particle stream—which will then require a smaller guiding field strength—a central bore 128 in the main inner core 124 of the energy transformer of Fig. 31 may be extended to any magnitude of its radius under preservation, otherwise of its rotational cross section. The main transformer flux flows through the inner side of this arrangement and is thus always linked magnetically with the particle stream in the toroidal chamber. The guiding field penetrates the toroidal vacuum chamber and is concentric with the secondary windings, magnetizing winding and energy winding, which all surround the inner, main transformer flux; and the returning flux flows and the exciting coil of the guiding field system is located at the outer side of the device. The dashed lines in Fig. 30 indicate the flow of the two magnetic fluxes.

In Fig. 2 the particle current is not only entirely linked with the main transformer flux, but partially also with the guiding flux, namely with that part of this flux $\varphi$ which crosses the gap within the particle ring current. Therefore, the exciting coil of the guiding flux receives a part of the energy produced during the deceleration of the particles. This energy can flow through the network 69 in Fig. 1 into the main lines feeding the power system 81. With the arrangement as indicated in Figs. 28, 29 and 30, 31, however, the part of the guiding flux which flows through any inner area of the particle current crosses also through the same inner area of the compensating energy winding, and this annihilates the effective linkage between both the primary and secondary currents and the guiding flux. In such arrangements, therefore, magnetizing currents and energy currents are entirely separated, flow in different circuits, and thereby may more easily be controlled.

The electrostatically guided particle decelerator as illustrated in Figs. 26, 27 may likewise be arranged around a smaller or larger center bore in the center leg in the same way as described for the magnetically guided particle decelerator with reference to Figs. 30 and 31, in order thus to allow for a greater orbit radius and a weaker electrical guiding field than in the case of an unperforated center leg 111, as shown in Figs. 26 and 27.

I claim:

1. The method of converting into alternating current the energy of electrically charged particles emitted from a carrier of radiant atomic energy which includes periodically directing a bundle of said charged particles into substantially circular orbits around a magnetic flux and causing the particles to revolve thereabout, and by periodically changing said flux, decelerating the motion of said particles on said orbits and thus producing thereon, as a primary circuit, a convection current of periodically alternating particle velocity and causing said primary convection current by means of said magnetic flux to induce, in a conductive secondary circuit linked with said magnetic flux, a secondary alternating current, thus converting the kinetic energy of the decelerating particles into alternating current energy and finally leading off the charges of the de-energized particles.

2. The method of converting into alternating current the energy of electrically charged particles emitted from a carrier of radiant atomic energy which includes subjecting said particles to deflecting space fields generated by polarized field producing elements disposed in close proximity to the trajectories of said particles for converging the divergent, emitted rays of said particles into a bundle of parallel rays and directing alternatingly and periodically said bundle into, and charging therewith, a circular closed orbital space around a magnetic flux and causing said particles to revolve in said space on substantially circular orbits, and thereon by changing the flux decelerating the motion of said particles in said orbital space and thus producing therein, as a primary circuit, a convection current of periodically alternating particle velocity and causing said primary convection current by means of said magnetic flux to induce, in a conductive secondary circuit linked with said magnetic flux, a secondary alternating current, thus converting the kinetic energy of the decelerating particles into alternating current energy and finally leading off the charges of the de-energized particles.

3. A lens system for deflecting the paths of electrically charged particles traversing with high velocity an enclosed space, said system comprising a multitude of polarized, field producing elements disposed within, and distributed as an array through and across said space and interspersed therein with interstices between said elements for causing said particles on their trajectories to pass therethrough while subjecting them to said fields; thereby to control the direction and mutual configuration of the paths of said electrically charged particles.

4. A space lens system for controlling within an enclosed space the paths of electrically charged particles emitted from a carrier of radiant atomic energy, said space lens system comprising a multitude of polarized, space field producing elements disposed within said space and distributed as an array through and across said space and interspersed therein with interstices between said elements for causing said particles on their trajectories to pass therethrough while subjecting them to said fields; thereby to deflect the trajectories of the particles diverging from said carrier with relation to one another and into at least one bundle of rays directed generally along a common axis.

5. The method of converting into alternating current the energy of electrically charged particles emitted from a carrier of radiant atomic energy which includes collecting divergent rays of said particles emitted from the carrier into a bundle of substantially parallel rays, directing said bundle alternatingly in the two senses of rotation and in the rhythm of the half-cycles of the alternating current into, and charging thereby, a circular closed orbital space and causing the particles to revolve therein on substantially circular orbits, and, within each of said half-cycles, decelerating the motion of said electrically charged particles in said orbital space, thus producing therein a convection current of periodically alternating particle velocity, as a primary current, and causing said primary convection current by means of said magnetic flux to induce, in a secondary conductive circuit linked with said magnetic flux, a secondary alternating current, thus converting the kinetic energy of the decelerating particles into alternating current energy and finally leading off the charges of the de-energized particles.

6. An apparatus for converting into alternating current energy the energy of electrically charged particles of great velocity collected in a bundle of unidirectional, substantially parallel rays, said apparatus including a toroidal vacuum chamber, an energy transformer comprising a magnetic core, a secondary winding on said core, network means for connecting said secondary winding to an alternating current network, said toroidal chamber being disposed upon and linked with said magnetic core; a conduit opening into said toroidal chamber for leading said bundle thereto; a deflector system being disposed about said bundle, a steering circuit with control and synchronizing means being connected to the deflector system for producing in said deflector a space field traversing said bundle and alternating rhythmically so as to steer said bundle in one direction into said chamber and thereon to deflect it into another direction; a guiding space field system including a pair of polarized field producing elements extended so as to confine between themselves a gap, said toroidal chamber being disposed in said gap, a guiding circuit system with control and synchronizing means for establishing a guiding space field between said polarized field producing elements and traversing said toroidal chamber and for controlling said guiding space field so as to vary in its intensity dependent upon the velocity of said particles thereby to cause the particles to revolve irrespective of their velocity on substantially constant circular orbits in the chamber as a closed orbital space; a magnetizing circuit coupled with said secondary winding of the energy transformer for producing in said energy transformer core a rhythmically alternating magnetizing field linked with said toroidal chamber and directed in relation to the sense of revolution of the particles in the chamber so that this field, during the decreasing and increasing periods of its cycles, decelerates the particles revolving in the chamber and charged thereto during other periods of the magnetizing field cycles; said toroidal chamber with the stream of decelerating particles revolving therein as a convection current forming the primary of said energy transformer and the kinetic energy of the decelerating particles being converted, by electromagnetic induction in the energy transformer, into alternating current energy to be supplied into said alternating current network from said secondary transformer winding.

7. An apparatus for converting into alternating current energy the energy of electrically charged particles emitted from a carrier of radiant atomic energy, said apparatus including a vacuum recipient for said carrier, a lens system disposed in said recipient for collecting the divergent rays of particles emitted from said carrier and refracting them into a bundle of unidirectional, substantially parallel rays; said apparatus further including a toroidal vacuum chamber, an energy transformer comprising a magnetic core, a secondary winding on said core, network means for connecting said secondary winding to an alternating current network; said toroidal chamber being disposed on and linked with said magnetic core; a vacuum conduit connecting said recipient with said toroidal chamber for leading said bundle thereto; a deflector system being disposed about said conduit, a steering circuit with control and synchronizing means connected to the deflector system for producing therein a space field traversing said bundle and alternating rhythmically so as to steer said bundle in one direction into said chamber and thereon deflect it in another direction; a guiding space field system including a pair of polarized field producing elements confining between themselves a gap, said toroidal chamber disposed in said gap, a guiding circuit system with control and synchronizing means for establishing a guiding space field between said polarized field producing elements and traversing said toroidal chamber and for controlling said guiding space field so as to vary in its intensity dependent upon the velocity of said particles thereby to cause the particles to revolve irrespective of their velocity or substantially constant circular orbits in the chamber as a closed orbital space; a magnetizing circuit coupled with said secondary winding of the energy transformer for producing in said energy transformer core a rhythmically alternating magnetizing field linked with said toroidal chamber and directed in relation to the sense of revolution of the particles in the chamber so that this field, during the decreasing and increasing periods of its cycles decelerates the particles revolving in the chamber and charged thereto during the other periods of the magnetizing field cycles; said toroidal chamber with the stream of decelerating particles revolving therein as a convection current forming the primary of said energy transformer and the kinetic energy of the decelerating particles being converted, by electromagnetic induction in the transformer, into alternating current energy to be supplied into said alternating current network from said secondary transformer winding.

8. A space lens system as set forth in claim 3 wherein said polarized, space field producing elements, disposed, with interstices therebetween, as an array within and across said space, are interspersed within said space in an axially symmetric arrangement about a longitudinal axis of said space and are distributed corresponding to a desired vergency of the trajectories of the electrically charged particles; thereby to subject the particles to the deflecting space fields produced by said elements and deflect the trajectories of the particles relatively to one another so as to establish the same as a united directed bundle of the desired vergency.

9. A space lens system as set forth in claim 4 wherein said polarized, space field producing elements, disposed, with interstices therebetween, as an array within and across said space, are interspersed within said space in an axially symmetric arrangement about a longitudinal axis of said space and are distributed corresponding to a desired convergence of the trajectories of the electrically charged particles diverging from said common source of particles; thereby to subject the particles to the deflecting space fields produced by said elements and deflect the trajectories of the particles relatively to one another so as to establish the same as a united directed bundle of the desired convergence.

10. A space lens system as set forth in claim 9 wherein said space field producing elements about said carrier are in fan-like spread meridian disposition about a common axis and are of substantially circular contour thereby to separate the particles diverging from said carrier into two oppositely directed bundles of rays, each generally directed along said common axis.

11. A space lens system as set forth in claim 8 wherein said polarized space field producing elements are constituted by permanent magnets of wedge shape and in fan-like spread meridian disposition about a common axis, north poles and south poles following one another in the same rotary sense thereby establishing about said common axis a circular magnet field of substantially constant field strength in the wedge-shaped interstices between said magnets and passed by said rays of particles.

12. A space lens system for deflecting electrically charged particles moving with high velocity and controlling the direction and configuration of their paths, said system comprising an array of flat coils disposed within the space traversed by said particles and distributed thereover in fan-like spread disposition and in meridian planes about a common axis; network means for connecting said coils to a source of current thereby to produce a circular magnetic field about said common axis.

13. A space lens system as set forth in claim 12 wherein said coils consist of turns comprising conductors extended along said axis and connected to said source so as to carry electric current in one direction and distributed over said meridian planes, said turns further comprising conductors disposed outside of the space traversed by said particles for closing back said first named conductors of the turns.

14. A space lens system as set forth in claim 13 wherein said conductors are shaped so as generally to follow with their meridian contours the trajectories of said particles.

15. A space lens system for deflecting within an enclosed space the paths of electrically charged particles moving with high velocity through said space, said system comprising a multitude of conductive elements disposed within said space, distributed as an array therethrough and thereacross and interspersed therein with interstices between said conductive elements; means for charging said elements electrically for producing deflecting electrostatic fields; thereby to cause said particles to pass through said interstices and subject them to said electrostatic fields for controlling the direction and mutual configuration of the paths of said electrically charged particles.

16. A space lens system for deflecting within an enclosed space the paths of electrically charged particles traversing said space with high velocity into a bundle of rays directed generally along a common axis, said system comprising a multitude of conductive elements of annular shape disposed in form of an array with interstices between said elements within said space and across the same about said common axis; said conductive elements generally following in their disposition the contours of the trajectories of the rays of said bundle, and means for imparting to said annular elements electric potentials increasing with the distance from said common axis for thus to produce deflecting electrostatic fields increasing with said distance; thereby to cause said particles to pass through said interstices while subjecting them to said electrostatic fields, for controlling the direction and mutual configuration of the paths of said electrically charged particles.

17. A space lens system as set forth in claim 16 wherein said annular conductive elements are rings disposed about said common axis and across the space traversed by said bundle; said rings in their disposition generally following the contours of the trajectories of the rays of said bundle.

18. A space lens system as set forth in claim 16 wherein said annular conductive elements are shells disposed about said common axis and across the space traversed by said bundle; the generatrices of said shells following in their shapes the contours of the trajectories of said bundle.

19. A space lens system as set forth in claim 3 for changing the vergency of a bundle of electrically charged particles by means of arcuate paths of their trajectories to be inserted between straight incoming parts and straight outgoing parts, wherein the meridian contours of said elements follow in their shape said arcuate paths and end at the straight parts of said trajectories.

20. An apparatus as set forth in claim 7 wherein the electromagnetic characteristics of said steering circuit system are such as to produce in said deflector a space field varying with an alternating rectangular curve shape, said synchronizing means being coupled with said magnetizing circuit for causing said deflector space field to oscillate in the rhythm of said alternating current; said deflector space field, one half of each cycle, steering the bundle of particle rays in one direction, the other half of each cycle in another direction towards a toroidal vacuum chamber.

21. An apparatus as set forth in claim 20 wherein said conduit includes a two-way admission conduit for said toroidal chamber, both ways tangentially joining the toroidal chamber for entrance of the particles into the chamber in opposite senses, the control and synchronizing means of said steering circuit system adapted to steer by means of the deflector space field said bundle into the chamber during one half of each alternating current cycle in the one sense and during the other half of each cycle in the other sense; said synchronizing means coupled with the energizing circuit of said deflector system and with the magnetizing circuit of the energy transformer thereby to cause revolution and deceleration of the particles in the toroidal chamber in the one sense of rotation during one half of each alternating current cycle and revolution and deceleration in the other sense of rotation during the other half of each alternating current cycle.

22. An apparatus as set forth in claim 7 wherein said guiding space field system includes a magnetic core, a magnetizing winding disposed on this magnetic core, and connected to said guiding circuit system; said pair of polarized space field producing elements being annular magnetic pole shoes confining between them said gap, the core of the energy transformer being extended through the circular openings of said annular pole shoes and of said toroidal chamber.

23. An apparatus as set forth in claim 7 wherein said guiding space field system includes a magnetic core, a magnetizing winding disposed on this magnetic core and connected to said guiding circuit system; said pair of polarized space field producing elements being annular magnetic pole shoes confining between them said gap, the core of the energy transformer and at least part of its secondary winding being extended through the circular openings of said annular pole shoes and of the toroidal chamber.

24. An apparatus as set forth in claim 7 wherein said guiding space field system includes a magnetic core, an energizing winding disposed on this magnetic core and connected to said guiding circuit system, said pair of polarized space field producing elements being annular magnetic pole shoes confining between them said gap, the core of the energy transformer and part of its secondary winding being extended through the circular openings of said annular pole shoes and of the toroidal chamber; another part of the secondary winding being spirally spread over the faces of said pole shoes facing the toroidal chamber thereby to compensate the leakage fields in the space between the orbital space of the particles, revolving in the toroidal chamber, and the secondary winding and produced by the primary convection current, formed by the revolving electrically charged particles, and the secondary conduction current of the transformer under load, both currents circulating around the magnetizing flux of the energy transformer.

25. An apparatus as set forth in claim 7 wherein said guiding space field system comprises polarized space field producing elements in the form of a pair of concentric conductive electrodes of substantially cylindric shape leaving between themselves said gap and enclosing therein said toroidal chamber confining the orbital space; said guiding circuit system with control and synchronizing means connected to said electrodes for establishing therebetween a guiding electric space field so as for said field to traverse the orbital space and for controlling the space field so as to vary in its intensity dependent upon the velocity of the particles revolving in the orbital space; a leg of the core of the energy transformer being extended through the space of the inner of said cylindric electrodes.

26. An apparatus as set forth in claim 25 wherein the secondary winding of the energy transformer is disposed about said leg of the core of the energy transformer coaxially with the toroidal chamber.

27. An apparatus as set forth in claim 7 wherein the core of said energy transformer is a body generally of rotational symmetry, including an inner, center leg and a peripheral shell, said secondary winding disposed on the center leg, said pair of polarized space field producing elements and the toroidal chamber between said pair disposed so as coaxially to surround the center leg and the secondary winding thereon.

28. An apparatus as set forth in claim 7 wherein the core of the energy transformer is a body generally of rotational symmetry, including an inner, center leg and a peripheral shell, said secondary winding disposed on the center leg; said guiding space field system comprising a pair of conductive electrodes of substantially cylindric shape, concentric with each other and coaxially surrounding said secondary winding inside the peripheral shell; said conductive electrodes of substantially cylindric shape leaving between themselves said gap and enclosing therein said toroidal chamber confining the orbital space; said guiding circuit system with control and synchronizing means connected to said electrodes for establishing therebetween a guiding electric space field so as for said guiding space field to traverse the orbital space and for controlling the guiding space field so as to vary in its intensity dependent upon the velocity of the particles revolving in the orbital space.

29. An apparatus as set forth in claim 7 wherein said energy transformer and said guiding space field system have a common magnetic core; said core being a body generally of rotational symmetry, including an inner, center leg and a peripheral shell; said secondary winding disposed about said center leg; the guiding space field system further including a magnetizing winding disposed inside of and adjacent to said peripheral shell and connected to said guiding circuit system; said pair of polarized space field producing elements being annular magnetic pole shoes disposed between both windings and coaxially therewith, said pole shoes confining between themselves said gap, said toroidal chamber disposed in the gap.

30. An apparatus as set forth in claim 7 for converting the energy of electrically charged particles emitted from a carrier of radiant atomic energy into polyphase alternating current wherein there are connected to the vacuum recipient of said carrier toroidal vacuum chambers of a number corresponding to the number of phases of the alternating current; each toroidal chamber having a deflector system, a steering circuit with control and synchronizing means connected to the deflector system, a guiding space field system and an energy transformer coupled therewith; said vacuum conduit including for each toroidal chamber a two-way admission duct for the particles, both ways tangentially joining the toroidal chamber for entrance of the particles into the chamber in opposite senses; said control and synchronizing means of the steering circuits of the chamber deflectors for steering by means of their deflector space fields the bundle into the various toroidal chambers during one half of each alternating current cycle in the one sense of rotation and during the other half of each cycle in the other sense of rotation, said deflector system further including at least one master deflector with steering master circuit including control and synchronizing means therefor for steering said bundle within each half of the alternating current cycles once into each one of said toroidal chambers, successively and cyclically into one after the other, and means for coupling the energy transformers to a polyphase system, at least by interlinking their secondary windings.

31. An apparatus as set forth in claim 7 wherein a synchronous motor is connected to said secondary winding for supplying thereto a voltage for the production of a magnetizing field component in said energy transformer.

32. An apparatus as set forth in claim 7 wherein a synchronous motor is connected to said secondary winding for supplying thereto a voltage for the production of a magnetizing field component in said energy transformer, and wherein a commutator-generator system and a network are coupled with the circuit of said synchronous motor for respectively energizing, controlling, and synchronizing the space fields of the deflector and the guiding space field system.

References Cited in the file of this patent

UNITED STATES PATENTS

| | | |
|---|---|---|
| 2,244,748 | Walker | June 10, 1941 |
| 2,299,792 | Bouwers et al. | Oct. 27, 1942 |
| 2,324,089 | Johnson | July 13, 1943 |
| 2,460,966 | Adler | Feb. 8, 1949 |
| 2,465,827 | Adler | Mar. 29, 1949 |
| 2,472,727 | Salinger et al. | June 7, 1949 |
| 2,489,328 | Salinger | Nov. 29, 1949 |
| 2,516,886 | Labin et al. | Aug. 1, 1950 |
| 2,520,603 | Linder | Aug. 29, 1950 |
| 2,555,116 | Coleman | May 29, 1951 |
| 2,563,807 | Alfven et al. | Aug. 14, 1951 |